US012619947B2

(12) United States Patent
Krishnan et al.

(10) Patent No.: US 12,619,947 B2
(45) Date of Patent: May 5, 2026

(54) SYSTEMS AND METHODS FOR TRACKING ITEM HANDLING DATA DURING LOGISTICS OPERATIONS

(71) Applicant: ZEBRA TECHNOLOGIES CORPORATION, Lincolnshire, IL (US)

(72) Inventors: Suvarna S. Krishnan, Westwood, MA (US); Izel Erdem, Port Jefferson Station, NY (US)

(73) Assignee: Zera Technologies Corporation, Lincolnshire, IL (US)

( * ) Notice: Subject to any disclaimer, the term of this patent is extended or adjusted under 35 U.S.C. 154(b) by 195 days.

(21) Appl. No.: 18/077,982

(22) Filed: Dec. 8, 2022

(65) Prior Publication Data

US 2024/0193537 A1     Jun. 13, 2024

(51) Int. Cl.
*G06Q 10/087* (2023.01)
(52) U.S. Cl.
CPC .................................. *G06Q 10/087* (2013.01)
(58) Field of Classification Search
CPC .......................... G06Q 10/087; G06Q 10/0833
USPC .......................................................... 705/28
See application file for complete search history.

(56) References Cited

U.S. PATENT DOCUMENTS

| | | | | | |
|---|---|---|---|---|---|
| 2005/0236417 | A1* | 10/2005 | Baker | ...................... | G07F 11/62 |
| | | | | | 221/92 |
| 2015/0046364 | A1* | 2/2015 | Kriss | .................. | G06Q 10/0833 |
| | | | | | 705/333 |

| | | | | | |
|---|---|---|---|---|---|
| 2016/0078399 | A1* | 3/2016 | Gadre | ................ | G06Q 30/0645 |
| | | | | | 705/28 |
| 2017/0280351 | A1* | 9/2017 | Skaaksrud | .......... | H04W 36/302 |
| 2018/0181909 | A1* | 6/2018 | Wilkinson | .......... | G06F 16/7867 |
| 2019/0238317 | A1* | 8/2019 | Nazarian | ................. | G06F 21/64 |
| 2019/0372775 | A1* | 12/2019 | Camenisch | ........... | H04L 9/3247 |
| 2019/0392386 | A1* | 12/2019 | Wilkinson | ......... | G06Q 10/0833 |
| 2022/0172163 | A1* | 6/2022 | Barton | ............... | G06Q 10/0833 |
| 2022/0318744 | A1* | 10/2022 | Toohey | ............ | G06K 19/07758 |
| 2024/0135476 | A1* | 4/2024 | Wu | ........................ | G06Q 20/389 |

FOREIGN PATENT DOCUMENTS

| | | | | | |
|---|---|---|---|---|---|
| EP | | 3144864 A1 | * | 3/2017 | ............. G01S 19/14 |
| WO | WO-2019178644 A1 | | * | 9/2019 | ............. G06Q 50/04 |

OTHER PUBLICATIONS

International Search Report and Written Opinion for International Application No. PCT/US2023/82040 mailed on Mar. 22, 2024.

* cited by examiner

*Primary Examiner* — Russell S Glass

(57) ABSTRACT

Systems and methods for tracking item handling data are disclosed herein. The method associates, by a first device of a first user, a first identifier of at least one first package comprising at least one item and a second identifier of a second package where the second package comprises the at least one first package and the association is indicative of a nested relationship. The method generates transaction information associated with the at least one item based on the association and packaging information of the at least one item, and generates a third identifier indicative of the transaction information associated with the at least one item applied to the second package. The method tracks at least one attribute of the transaction information associated with the at least one item via the third identifier.

15 Claims, 12 Drawing Sheets

*200*

Start

*202* Package, By A First User, At Least One Item And Generate Transaction Information Associated With At Least One Item

*204* Transport, By A Second User, The At Least One Item To A Third User

*206* Process, By The Third User, The At Least One Item

*208* Transport, By The Second User, The At Least One Item To An End User

End

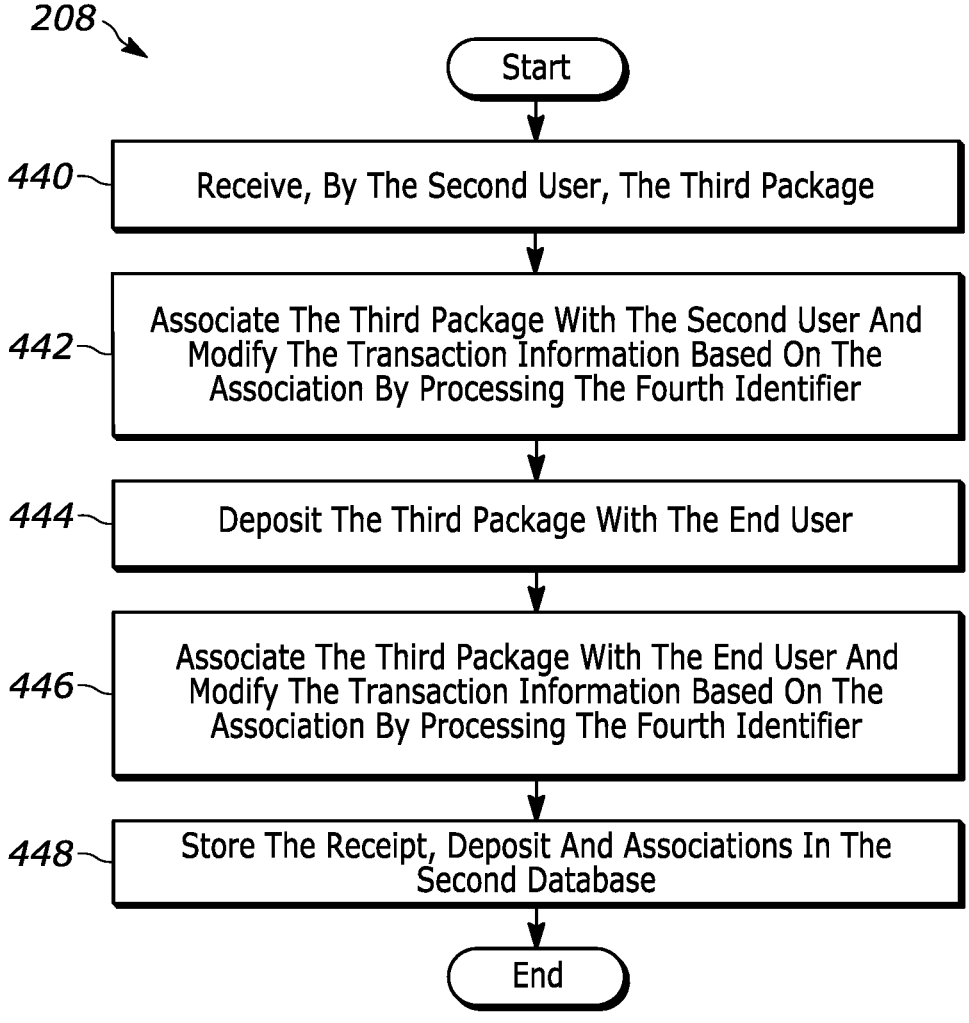

*208*

Start

*440* — Receive, By The Second User, The Third Package

*442* — Associate The Third Package With The Second User And Modify The Transaction Information Based On The Association By Processing The Fourth Identifier

*444* — Deposit The Third Package With The End User

*446* — Associate The Third Package With The End User And Modify The Transaction Information Based On The Association By Processing The Fourth Identifier

*448* — Store The Receipt, Deposit And Associations In The Second Database

End

Start

*602* → Package, By An End User, At Least One Item For Return In A Return Package And Generate Return Transaction Information Associated With The At Least One Item

*604* → Transport, By The Second User, The At Least One Item To The Third User

*606* → Process, By The Third User, The At Least One Item

End

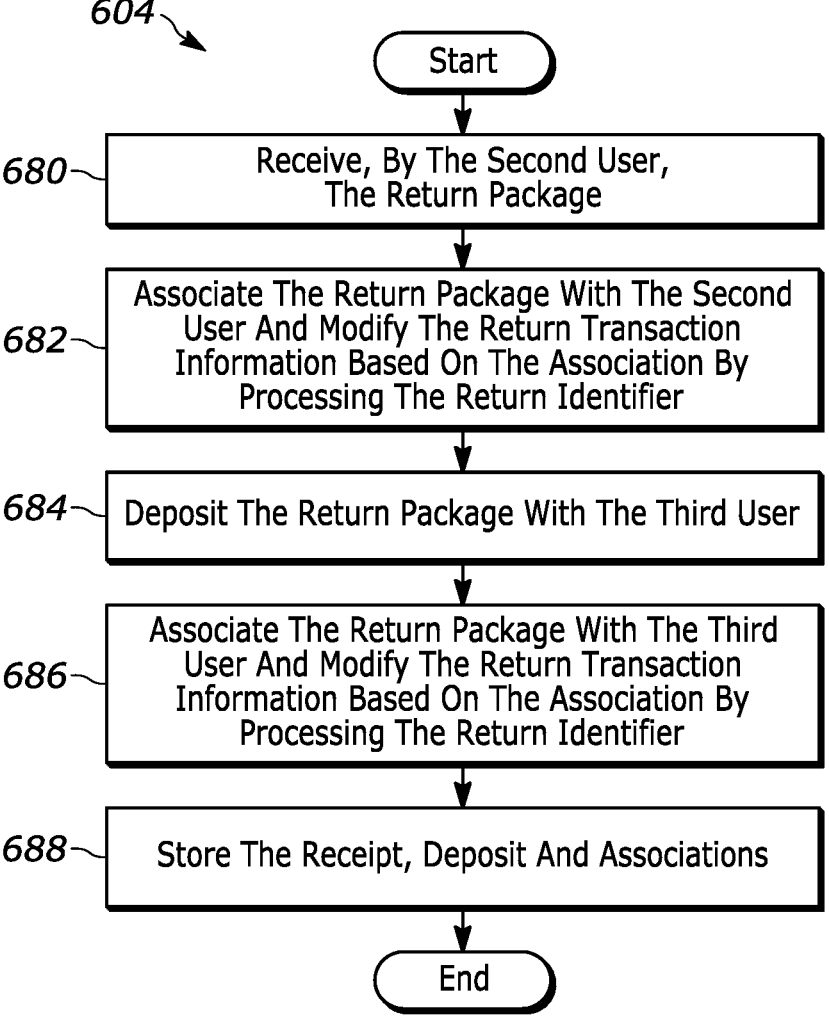

*604*

Start

680 — Receive, By The Second User, The Return Package

682 — Associate The Return Package With The Second User And Modify The Return Transaction Information Based On The Association By Processing The Return Identifier 684 — Deposit The Return Package With The Third User 686 — Associate The Return Package With The Third User And Modify The Return Transaction Information Based On The Association By Processing The Return Identifier 688 — Store The Receipt, Deposit And Associations End

FIG. 11

SYSTEMS AND METHODS FOR TRACKING ITEM HANDLING DATA DURING LOGISTICS OPERATIONS

BACKGROUND

Logistics operations include the transportation and distribution (e.g., delivery) of items (e.g., packages) to destination locations (e.g., residences or businesses) and typically involve a multi-party (e.g., a manufacturer, a distributor and at least one transportation company or transporter) logistics supply chain to transport and distribute the items. Items may be packaged across several packaging levels for transportation. For example, at least one item may be packaged within a carton, the carton may be packaged within a case comprising a plurality of cartons, and the case may be packaged within a pallet comprising a plurality of cases which is loaded into a container (e.g., implemented as a storage unit affixed to or stored in a vehicle or a storage area integrated in at least a portion of a vehicle) for transportation and distribution. As such, it can be challenging to associate events (e.g., packaging, shipment, receiving, inspection, scanning and the like) and/or conditions (e.g., fair, tampered, damaged, environmental, and the like) with an item across packaging levels thereof during logistics operations (e.g., loading, shipment, delivery, and/or collection operations). Additionally, it can also be challenging to associate these events and/or conditions with an item that is returned (e.g., via a returned merchandise authorization (RMA)).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 7 is a flowchart illustrating step 208 of FIG. 2 in greater detail.

FIG. 11 is a flowchart illustrating step 604 of FIG. 9 in greater detail.

Figure 1:
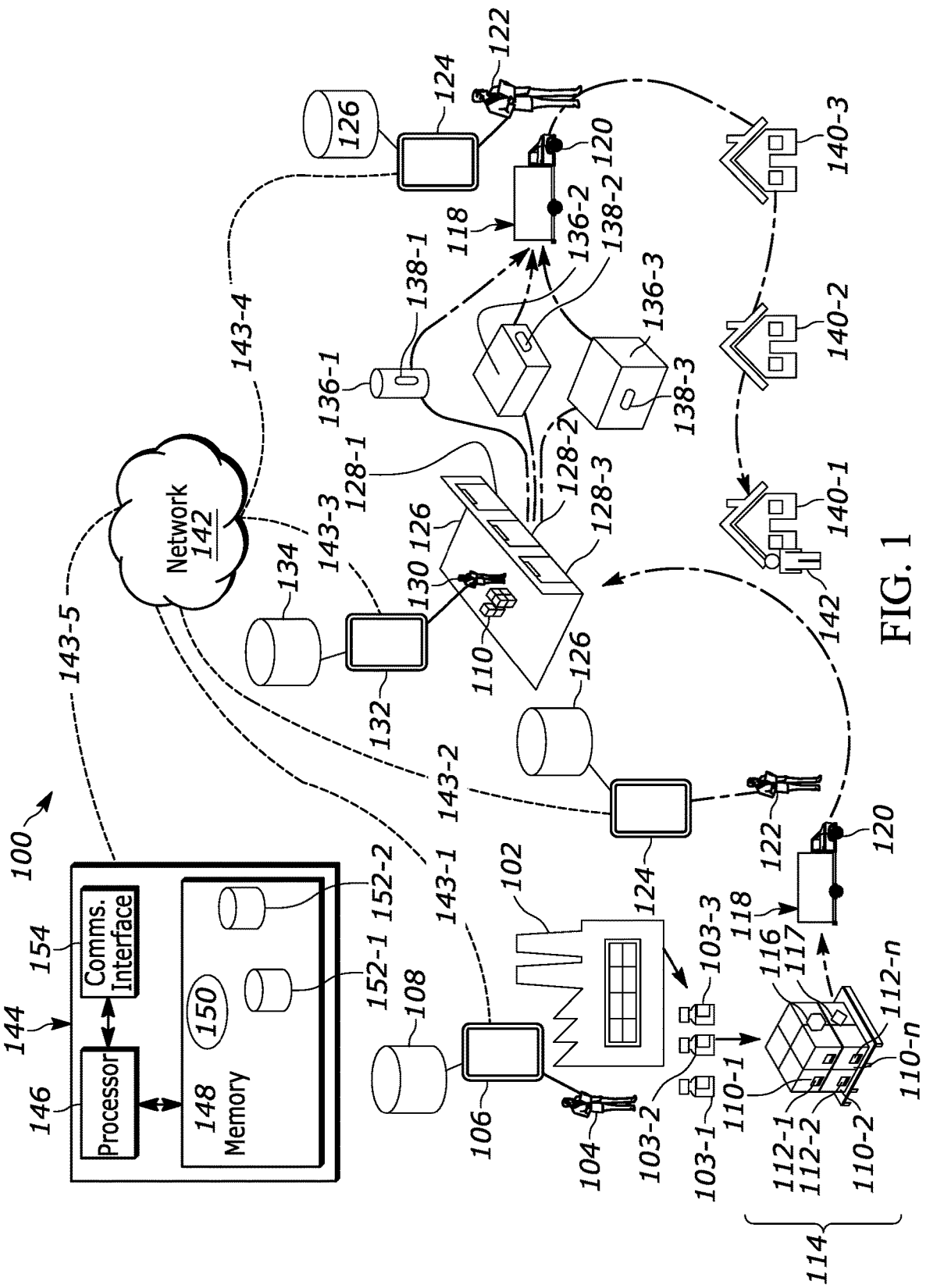
FIG. 1 is a diagram illustrating an embodiment of a system of the present disclosure for tracking item handling data during logistics operations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As mentioned above, it can be challenging to associate events (e.g., packaging, shipment, receiving, inspection, scanning and the like) and/or conditions (e.g., fair, tampered, damaged, environmental, and the like) with an item across packaging levels thereof during logistics operations and it can also be challenging to associate these events and/or conditions with an item that is returned (e.g., via a returned merchandise authorization (RMA)). Conventional systems and methods can utilize a plurality of information systems associated with respective logistics supply chain parties (e.g., a manufacturer, a distributor and/or at least one transportation company or transporter) to track item handling data during logistics operations. However, these information systems often store proprietary and/or confidential information that preclude their access by and/or sharing with other parties thereby obviating the utility of these conventional systems and methods. For example, a manufacturer information system may store proprietary and/or confidential manufacturing information (e.g., raw materials, suppliers, a manufacturing site, etc.) associated with an item thereby precluding access to the manufacturer information system by a distributor and/or at least one transportation company. In addition, conventional systems and methods do not provide detailed item handling data during logistics operations. For example, conventional systems and methods do not provide tiered or nested relationship data across packaging levels of an item.

As such, conventional systems suffer from a general lack of versatility because these systems cannot automatically and dynamically identify items and data associated therewith during different logistics operations (e.g., loading, shipment, delivery, and/or collection). For example, these systems cannot automatically and dynamically identify items across packaging levels of an item, track at least one attribute of transaction information (e.g., a contract or agreement) associated with the at least one item, and share detailed item handling data associated with the transaction information during logistics operations with respective logistics supply chain parties (e.g., a manufacturer, a distributor and/or at least one transportation company). Overall, this lack of versatility causes conventional systems to provide underwhelming performance and reduces the efficiency, security, and general timeliness of executing and completing logistics operations.

Thus, it is an objective of the present disclosure to eliminate these and other problems with conventional systems and methods via systems and methods that can automatically and dynamically identify items and data associated therewith during different logistics operations (e.g., loading, shipment, delivery, and/or collection operations). For example, the systems and methods of the present disclosure alleviate the issues present with conventional systems by automatically and dynamically identifying items across packaging levels of an item, tracking at least one attribute of transaction information (e.g., a purchase contract) associated with the at least one item, and sharing detailed item handling data associated with the transaction information during logistics operations with respective logistics supply chain parties (e.g., a manufacturer, a distributor and/or at least one transportation company or transporter).

In accordance with the above, and with the disclosure herein, the present disclosure includes improvements in computer functionality or in improvements to other technologies at least because the present disclosure describes that, e.g., logistics operational systems, and their related various components, may be improved or enhanced with the disclosed dynamic system features and methods that provide more efficient working conditions for workers and improved monitoring and management of logistics operations for system administrators. That is, the present disclosure describes improvements in the functioning of an operational system itself or "any other technology or technical field" (e.g., the field of distributed/commercial/industrial logistics information systems). For example, the disclosed dynamic system features and methods improve and enhance the identification of items across packaging levels thereof, the tracking of at least one attribute of transaction information (e.g., a contract or agreement) associated with the at least one item, and the sharing of detailed item handling data associated with the transaction information during logistics operations with respective logistics supply chain parties (e.g., a manufacturer, a distributor and/or at least one transportation company or transporter) to mitigate (if not eliminate) worker error, facilitate logistics supply chain workflows, and eliminate inefficiencies (e.g., tampered or damaged items) typically experienced over time by systems lacking such features and methods. This improves the state of the art at least because such previous systems are inefficient as they lack the ability to automatically and dynamically identify items across packaging levels of an item, track at least one attribute of transaction information (e.g., a contract or agreement) associated with the at least one item, and share detailed item handling data associated with the transaction information during logistics operations with respective logistics supply chain parties (e.g., a manufacturer, a distributor and/or at least one transportation company).

In addition, the present disclosure applies various features and functionality, as described herein, with, or by use of, a particular machine, e.g., a processor, a mobile device, a receiver or transceiver device (e.g., a radio frequency identification (RFID) reader or a Bluetooth Low Energy (BLE) gateway), a scanner, and/or other hardware components as described herein.

Moreover, the present disclosure includes specific features other than what is well-understood, routine, conventional activity in the field, or adding unconventional steps that demonstrate, in various embodiments, particular useful applications, e.g., utilizing and/or controlling signal processing protocols (e.g., authentication, association, etc.) of a receiver or transceiver device (e.g., an RFID reader or a BLE gateway) in connection with and/or a state of transaction information associated with at least one item.

Accordingly, it would be highly beneficial to develop a system and method that can automatically and dynamically identify an item across packaging levels of the item, track at least one attribute of transaction information (e.g., a contract or agreement) associated with the item, and share detailed item handling data associated with the transaction information during logistics operations with respective logistics supply chain parties (e.g., a manufacturer, a distributor and/or at least one transportation company). The systems and methods of the present disclosure address these and other needs.

In an embodiment, the present disclosure is directed to a method for tracking item handling data. The method comprises associating, by a first device of a first user, a first identifier of at least one first package comprising at least one item and a second identifier of a second package where the second package comprises the at least one first package and the association is indicative of a nested relationship. The method generates transaction information associated with the at least one item based on the association and packaging information of the at least one item. The method generates and applies a third identifier indicative of the transaction information associated with the at least one item to the second package and tracks at least one attribute of the transaction information associated with the at least one item via the third identifier.

In an embodiment, the present disclosure is directed to a system for tracking item handling data comprising a first device, a second device, a third device, one or more processors, and a non-transitory computer-readable memory coupled to the first device, the second device, the third device, and the one or more processors. The memory stores instructions thereon that, when executed by the one or more processors, cause the one or more processors to: associate, by the first device of a first user, a first identifier of at least one first package comprising at least one item and a second identifier of a second package, the second package comprising the at least one first package and the association being indicative of a nested relationship; generate transaction information associated with the at least one item based on the association and packaging information of the at least one item; generate a third identifier indicative of the transaction information associated with the at least one item to be applied to the second package; and track at least one attribute of the transaction information associated with the at least one item via the third identifier.

In an embodiment, the present disclosure is directed to a tangible machine-readable medium comprising instructions for tracking item handling data that, when executed, cause a machine to: associate, by a first device of a first user, a first identifier of at least one first package comprising at least one item and a second identifier of a second package, the second package comprising the at least one first package and the association being indicative of a nested relationship; generate transaction information associated with the at least one item based on the association and packaging information of the at least one item; generate a third identifier indicative of the transaction information associated with the at least one item to be applied to the second package; and track at least one attribute of the transaction information associated with the at least one item via the third identifier.

In an embodiment, the present disclosure is directed to a method for tracking item handling data. The method comprises identifying, by an end user via an end user device, order information of at least one item designated for return; receiving return identification information of the at least one item based on the identified order information associated with the at least one item; generating return shipment information in response to the received return identification information of the at least one item; generating return transaction information associated with the at least one item based on the order information, the return identification information, and the return shipment information; receiving a return identifier indicative of the return transaction information associated with the at least item to be applied by the end user to a return package comprising the at least one item; and tracking at least one attribute of the return transaction information associated with the at least one item via the return identifier.

In an embodiment, the present disclosure is directed to a system for tracking item handling data comprising a device of an end user, one or more processors, and a non-transitory computer-readable memory coupled to the end user device and the one or more processors. The memory stores instructions thereon that, when executed by the one or more processors, cause the one or more processors to: receive, from the end user device, order information of at least one item designated for return; receive return identification information of the at least one item based on the received order information associated with the at least one item; generate return shipment information in response to the received return identification information of the at least one item; generate return transaction information associated with the at least one item based on the order information, the return identification information, and the return shipment information; generate a return identifier indicative of the return transaction information associated with the at least item to be applied to a return package comprising the at least one item; and track at least one attribute of the return transaction information associated with the at least one item via the return identifier.

In an embodiment, the present disclosure is directed to a tangible machine-readable medium comprising instructions for tracking item handling data that, when executed, cause a machine to: receive, from an end user device, order information of at least one item designated for return; receive return identification information of the at least one item based on the received order information associated with the at least one item; generate return shipment information in response to the received return identification information of the at least one item; generate return transaction information associated with the at least one item based on the order information, the return identification information, and the return shipment information; generate a return identifier indicative of the return transaction information associated with the at least item to be applied to a return package comprising the at least one item; and track at least one attribute of the return transaction information associated with the at least one item via the return identifier.

Turning to the Drawings, FIG. 1 is a diagram 100 illustrating an embodiment of a system of the present disclosure for tracking item handling data during logistics operations (e.g., packaging, loading, shipment, delivery, and/or collection operations). As described in greater detail below, the system 100 includes a computing device 144 communicatively coupled with, devices 106, 124 and 132. The devices 106, 124 and 132 are respectively associated with a first user 104 (e.g., of a manufacturing facility 102), a second user 122 (e.g., of a transportation company or transporter), and a third user 130 (e.g., of an item handling facility 126).

As shown in FIG. 1, the computing device 144 can exchange data with each of the devices 106, 124 and 132, e.g., via a network 142 implemented as any suitable combination of local and wide-area networks and respective communication links 143-1, 143-2 and 143-4, and 143-3. The system 100 provides for automatically and dynamically identifying an item 103 across packaging levels of the item 103, tracking at least one attribute of transaction information (e.g., a contract or agreement) associated with the item 103, and sharing detailed item handling data associated with the transaction information via shared first and second databases 152-1 and 152-2 during logistics operations with respective logistics supply chain parties (e.g., a manufacturer, a distributor and/or at least one transportation company or transporter).

A manufacturing facility 102 can produce a plurality of items 103-1, 103-2, 103-3 (collectively referred to as items 103, and generically referred to as an item 103). The system 100 can generate a first identifier 112 (e.g., a machine-readable symbol, a label, a temperature sensitive marker, a barcode, a radio frequency identification (RFID) tag, a quick response (QR) code, a Bluetooth Low Energy (BLE) beacon, etc.) and a first user 104 (e.g., a manufacturing facility worker) can apply the first identifier 112 to a first package 110 comprising at least one item 103 based on a detected event (e.g., a workflow trigger). The detected event can be associated with the item 103 and can include, but is not limited, a purchase order, inventory reallocation, and a threshold (e.g., a shelf-life of the item 103).

The first user 104 can also apply a second identifier 116 (e.g., a machine-readable symbol, a label, a temperature sensitive marker, a barcode, an RFID tag, a QR code, a Bluetooth Low Energy (BLE) beacon, etc.) to a second package 114 comprising at least one first package 110. As shown in FIG. 1, the second package 116 (e.g., a pallet) can be comprised of a plurality of first packages 110-1, 110-2, and 110-n (collectively referred to as first packages 110, and generically referred to as a first package 110) where each first package 110-1, 110-2 and 110-n is respectively associated with a first identifier 112-1, 112-2, and 112-n (collectively referred to as first identifiers 112, and generically referred to as a first identifier 112).

The first user 104 can utilize a device 106 including, but not limited to, a tablet, a receiver or transceiver device (e.g., an RFID reader), a scanner (e.g., a barcode reader) or any suitable combination thereof for authentication and processing. For example, the first user 104 can input a passcode and/or submit biometric data (e.g., a fingerprint) via a graphical user interface (GUI) of the device 106 for authentication purposes. Upon authentication, the first user 104 can utilize the device 106 to associate the first identifier 112 of the first package 110 with the second identifier 116 of the second package 114. Additionally, the system 100 can generate transaction information (e.g., a contract or agreement) associated with the item 103 based on the association of the first identifier 112 of the first package 110 and the second identifier 114 of the second package 116.

Items 103 may be packaged across several packaging levels for transportation. As mentioned above, the second package 116 (e.g., a pallet) can be comprised of a plurality of first packages 110-1, 110-2, and 110-n. For example, at least one item 103 may be packaged within a case (e.g., a first package 110), and the case may be packaged within a pallet (e.g., a second package 114 comprising a plurality of first packages 110) which is loaded into a container for transportation. As such, the association of the first identifier 112 of the first package 110 and the second identifier 116 of the second package 114 is indicative of a nested or tiered relationship between the first package 110 and the second package 116. Additional packaging levels can be utilized. In another example, at least one item 103 may be packaged within a carton (e.g., a first package 110), the carton may be packaged within a case (e.g., a second package 114 comprising a plurality of first packages 110), and the case may be packaged within a pallet (e.g., a third package (not shown) comprising a plurality of second packages 114) which is loaded into a container for transportation.

As described in further detail below, this association provides for automatically and dynamically identifying an item 103 across packaging levels (e.g., the first package 110 and the second package 114) thereof and authenticating the transaction information associated with the item 103. The transaction information may be encrypted and/or it may be structured as a blockchain. The system 100 can generate and the first user 104 can apply a third identifier 117 (e.g., a machine-readable symbol, a label, a barcode, an RFID tag, a QR code, a Bluetooth Low Energy (BLE) beacon, etc.) indicative of the transaction information (e.g., a contract or agreement) to the second package 114.

The first user 104 can store, in a proprietary database 108 of the manufacturing facility 102, information associated with the item 103 including, but not limited to, an item 103 code; regulatory code(s) (e.g., a drug code, dosage, and/or strength); an item 103 expiration date; item 103 temperature data and storage requirements; package identifiers and packaging level associations; internet of things (IoT) event data; proprietary and/or confidential manufacturing information (e.g., raw materials, suppliers, a manufacturing site, etc.); packaging information (e.g., packaging location, packaging date and/or time, manufacturer identification information, etc.); and shipment information.

The user 104 can also store the first identifier 112, the second identifier 116, the third identifier 117, and packaging information of the item 103 (e.g., packaging location, packaging date and/or time, manufacturer identification information, etc.) in a first shared database 152-1 accessible by authenticated users of at least two of the manufacturing facility 102, an item handling facility 126 and a transportation company or transporter (not shown).

In an embodiment, a worker (e.g., a first user 104) of a manufacturing facility 102 may transport the second package 114 to an item handling facility 126 (e.g., a distributor such as, a warehouse, retail facility, and transit facility including, but not limited to, an airport, depot, or the like). As such, the first shared database 152-1 can be accessible by authenticated users of the manufacturing facility 102 and the item handling facility 126. In another embodiment, a worker (e.g., a second user 122) of a transportation company or transporter may transport the second package 114 to the item handling facility 126. As such, the first shared database 152-1 can be accessible by authenticated users of the manufacturing facility 102 and the transportation company or transporter.

The system 100 can include additional shared databases to accommodate access by any combination of authenticated users of the manufacturing facility 102, the item handling facility 126, the transportation company or transporter, and the like. Additionally, the steps performed by the first user 104 including, but not limited to, packaging, labeling, and transporting can be performed by a single individual or performed by a plurality of individuals of a manufacturing facility 102.

As shown in FIG. 1, the second package 114 (e.g., a pallet) may be transported from a manufacturing facility 102 to the item handling facility 126 by the second user 122 of a transportation company or transporter. As mentioned above, the item handling facility 126 can be, for example, a distributor such as, a warehouse, retail facility, and transit facility including, but not limited to, an airport, depot, or the like. The second package 114 may be transported via a container 118 implemented as a storage unit affixed to or stored in a vehicle 120 (e.g., a box truck, a semi-trailer, or the like) operated by the second user 122 or a container 118 implemented as a storage area integrated in at least a portion of a vehicle 120 (e.g., a cargo van, a sprinter van, and a sports utility vehicle (SUV)) operated by the second user 122.

The second user 122 can utilize a device 124 including, but not limited to, a tablet, a receiver or transceiver device (e.g., an RFID reader), and a scanner (e.g., a barcode scanner) for authentication and processing. For example, the second user 122 can input a passcode and/or submit biometric data (e.g., a fingerprint) via a GUI of the mobile device 124 for authentication purposes. Upon authentication, the second user 122 can receive the second package 114 from the first user 104 of the manufacturing facility 102 and can utilize the device 124 to associate the second package 114 with the transportation company or transporter (e.g., the second user 122) by processing the third identifier 117 via the device 124. This association can be indicative of receipt of the second package 114 by the transportation company or transporter from the manufacturing facility 102.

The second user 122 can also deposit (e.g., deliver) the second package 114 with a third user 130 of the item handling facility 126. Upon deposit of the second package 114, the second user 122 can utilize the device 124 to associate the second package 114 with the item handling facility 126 (e.g., a third user 130) by processing the third identifier 117 via the device 124. This association can be indicative of the deposit (e.g., delivery) of the second package 114 by the transportation company to the item handling facility 126.

The second user 122 can store, in a transportation company or transporter proprietary database 126, information associated with the transportation of the second package 114 including, but not limited to, dimensions and/or weight of the second package 114, second user 122 identification information, container 118 and/or vehicle 120 type, and route information and coordinates. The system 100 can store receipt and deposit event data and associated timestamps (e.g., time and/or date), in addition to the associations, in a first shared database 152-1 accessible by authenticated users of at least two of the manufacturing facility 102, an item handling facility 126 and the transportation company or transporter.

As shown in FIG. 1, an item handling facility 126 can include load bays 128-1, 128-2, and 128-3 (collectively referred to as load bays 128, and generically referred to as a load bay 128). The item handling facility 126 can include a portion of a building, such as a cross dock or portion thereof, including the load bays 128.

The load bays 128 may, for example, be arranged along an outer wall of the item handling facility 126, such that one or more containers 118 can be positioned proximate to the load bays 128 from the exterior of the item handling facility 126. In other examples, smaller or greater numbers of load bays 128 may be included. The load bays 128 are illustrated as being dock structures enabling access from within the item handling facility 126 to an exterior of the item handling facility 126 where a container 118 is positioned. In other examples, one or more of the load bays 128 may be implemented as a load station within the item handling facility 126, to load or unload containers 118 that are handled inside the item handling facility 126.

Each load bay 128 may be configured to accommodate a container 118 such that one or more containers 118 can be positioned proximate to the load bays 128 from the exterior of the item handling facility 126. As described above, a container 118 can be implemented as a storage unit affixed to or stored in a vehicle 120 (e.g., a box truck, a semi-trailer, or the like) or as a storage area integrated in at least a portion of a vehicle 120 (e.g., a cargo van, a sprinter van, and an (SUV)). The container 118 may have a substantially horizontal internal depth, extending from an open end (e.g., a wall with a door or other opening allowing access to an interior of the container 118) of the container 118 to a closed end, a substantially horizontal internal width perpendicular to the depth, and a substantially vertical internal height.

Each load bay 128 includes an opening, e.g., in a wall of the item handling facility 126, that allows a third user 130 within the item handling facility 126 to access an interior of the container 118 to inspect the second package 114 and receive or reject the second package 114 from the second user 122 based on the inspection. For example, when a container 118 is positioned at a load bay 128 (e.g., with the open end of the container 118 substantially flush with the opening of the load bay 128), the third user 130 can inspect the second package 114, receive or reject the second package 114 based on the inspection, and, if received, unload the second package 114 from the container 118 to a staging area (not shown) for processing.

The third user 130 can utilize a device 132 including, but not limited to, a tablet, a receiver or transceiver device (e.g., an RFID reader), and a scanner (e.g., a barcode scanner) for authentication and processing. For example, the third user 130 can input a passcode and/or submit biometric data (e.g., a fingerprint) via a GUI of the mobile device 132 for authentication purposes. Upon authentication, the third user 130 can inspect the second package 114 to determine at least one condition (e.g., fair, tampered, damaged, environmental, etc.) thereof and the system 100 can associate the determined at least one condition with the transaction information by processing the third identifier 117 via the device 132. For example, by processing the third identifier 117 via the device 132, the system 100 can add the determined at least one condition of the second package 114 to the transaction information.

The at least one condition can be indicative of a state of the second package 114 as a whole and/or a state of portions thereof (e.g., one or more first packages 110). The at least one condition can include, but is not limited to, one or more of fair (e.g., original, sealed, unadulterated, untarnished, or the like), tampered (e.g., unsealed, opened, ripped, or the like), damaged (e.g., crushed, wet, or the like) and environmental (e.g., freezing, ambient, or the like). The system 100 can automatically and dynamically determine whether the determined at least one condition complies with the transaction information based on one or more of the first identifier 112 of the first package 110 and the second identifier 116 of the second package 114 associated with the transaction information. For example, if the transaction information indicates that the at least one item 103 is a vial of medicine and the determined at least one condition of the second package 114 is fair, then the second package 114 can be considered to comply with the transaction information. Alternatively, if the transaction information indicates that the at least one item 103 is a vial of medicine and the determined at least one condition of the second package 114 is tampered, then the second package 114 can be considered not to comply with the transaction information.

If the system 100 determines that the at least one condition complies with the transaction information, then the system 100 can display a message (e.g., a text, alert, request, or the like) to the third user 130 via the GUI of the device 130 to receive the second package 114 and/or to submit an input (e.g., keystroke, tap, button depression, or the like) via the GUI or an input device (e.g., pad, keyboard, or the like) of the device 130 to confirm receipt of the second package 114. If the system 100 determines that the at least one condition does not comply with the transaction information, then the system 100 can display a message (e.g., a text, alert, request, or the like) to the third user 130 via the GUI of the device 130 to reject the second package 114 and/or to submit an input (e.g., keystroke, tap, button depression, or the like) via the GUI or an input device (e.g., pad, keyboard, or the like) of the device 130 to confirm rejection of the second package 114.

Upon receipt of the second package 114 (e.g., when the at least one condition complies with the transaction information), the system 100 can modify the transaction information. For example, the system 100 can add a receiving event to the transaction information to indicate that the second package 114 has been received by the item handling facility 126 and/or to notify (e.g., alert) the manufacturing facility 102 that the second package 114 has been received by the item handling facility 126. The third user 130 can deconstruct (e.g., breakdown) the second package 114 (e.g., a pallet) by processing the second identifier 116 of the second package 114 and processing the first identifier 112 of each first package 110 when removing each first package 110 from the second package 114.

The system 100, based on processing the second identifier 116 and each first identifier 112, can determine whether the association (e.g., nested or tiered relationship) of each first identifier 112 of each first package 110 and the second identifier 116 of the second package 114 complies with the transaction information. If the system 100 determines that the association of each first identifier 112 of each first package 110 and the second identifier 116 of the second package 114 complies with the transaction information, then the system 100 authenticates the transaction information. For example, the system 100 can add an authentication event to the transaction information indicating that the item 103 associated with the transaction information is authentic and/or that the terms of the transaction information have been satisfied. If the system 100 determines that the association of each first identifier 112 of each first package 110 and the second identifier 116 of the second package 114 does not comply with the transaction information, then the system 100 can generate a notification (e.g., an alert). For example, the system 100 can add an alert to the transaction information indicating that at least one item 103 is fraudulent (e.g., a counterfeit), an incorrect item, and/or missing (e.g., when an insufficient number of first identifiers 112 are processed). In this way, the system 100 can ensure the integrity of the transaction information and facilitate the resolution of disputes between respective logistics supply chain parties (e.g., a manufacturer, a distributor and/or at least one transportation company or transporter).

The item handling facility 126 can receive order information from an end user 142 for at least one item 103. For example, an end user (e.g., a customer or consumer) can submit order information for the at least one item 103 to be fulfilled by the item handling facility 126 where the order information can include, but not limited to, a quantity of the at least one item 103, a shipping (e.g., delivery) address, delivery instructions, or the like. The system 100 can generate shipment information in response to the received order information. The shipment information can include, but is not limited to, a third package identification number (e.g., a parcel identification number), an item handling facility 126 location, shipping date and/or time, a shipping address, delivery instructions, or the like. Additionally, the system 100 can modify the transaction information based on the generated shipment information. For example, the system 100 can add the shipment information to the transaction information. The system 100 can generate and the third user 130 can apply, a fourth identifier 138 indicative of the modified transaction information to a third package 136 comprising the at least one item 103. For example, and as shown in FIG. 1, the third user 130 can respectively apply third identifiers 138-1, 138-2, 138-3 (collectively referred to as third identifiers 138, and generically referred to as a third identifier 138) to third packages 136-1, 136-2, 136-3 (collectively referred to as third packages 136, and generically referred to as a third package 136).

The third user 130 can store, in a proprietary database 134 of the item handling facility 126, information associated with the at least one item 103 including, but not limited to, an inspection event (e.g., a date and/or time, location, third user 130 identification information, or the like), a determined condition of the second package 114, a receiving event or rejection event (e.g., a date and/or time, location, third user 130 identification information, or the like), an association of the first identifier 112 of the first package 110 and the second identifier 116 of the second package 114, compliance with the association (e.g., an authentication event or notification), and a shipping event (e.g., a date and/or time, location, and/or third user 130 identification information).

The system 100 can store the fourth identifier and the shipment information (e.g., the third package identification number, item handling facility 126 location, shipping date and/or time, shipping address, delivery instructions, or the like) in a second shared database 152-2 accessible by authenticated users of the item handling facility 126 and the transportation company or transporter. The system 100 can include additional shared databases to accommodate access by any combination of authenticated users of the manufacturing facility 102, the item handling facility 126, the transportation company, and the like. Additionally, the steps performed by the third user 130 including, but not limited to, inspection, receipt, rejection, labeling, and shipping can be performed by a single individual or performed by a plurality of individuals of an item handling facility 126.

In logistics operations, a wide variety of items, such as packages and other freight, can be transported from origin locations to destination locations, often via a variety of intermediate locations. As shown in FIG. 1, third packages 136 may be transported from the item handling facility 126 to destination locations, such as residences 140-1, 140-2, and 140-3 (collectively referred to as the destination locations 140, and generically referred to as a destination location 140). The third packages 136 may be transported via a container 118 implemented as a storage unit affixed to or stored in a vehicle 120 (e.g., a box truck, a semi-trailer, or the like) operated by the second user 122 or a container 118 implemented as a storage area integrated in at least a portion of a vehicle 120 (e.g., a cargo van, a sprinter van, and a sports utility vehicle (SUV)) operated by the second user 122.

The second user 122 can utilize the device 124 including, but not limited to, a tablet, a receiver or transceiver device (e.g., an RFID reader), and a scanner (e.g., a barcode scanner) for authentication and processing. For example, the second user 122 can input a passcode and/or submit biometric data (e.g., a fingerprint) via a GUI of the device 124 for authentication purposes. Upon authentication, the second user 122 can receive the third package 136 from the third user 130 of the item handling facility 126 and can utilize the device 124 to associate the third package 136 with the transportation company or transporter by processing the fourth identifier 138 via the device 124. This association can be indicative of receipt of the third package 136 by the transportation company or transporter from the item handling facility 126.

The third user 122 can also deposit (e.g., deliver) the third package 136 with an end user 142 (e.g., a customer or consumer) of a destination location (e.g., destination location 140-1). Upon deposit of the third package 136, the second user 122 can utilize the device 124 to associate the third package 136 with the destination location 140-1 (e.g., the end user 142) by processing the fourth identifier 138 via the device 124. This association can be indicative of the deposit (e.g., delivery) of the third package 136 by the transportation company to the destination location 140-1.

The second user 122 can store, in a transportation company proprietary database 126, information associated with the transportation of the third package 136 including, but not limited to, dimensions and/or weight of the third package 136, second user 122 identification information, container 118 and/or vehicle 120 type, and route information and coordinates. The user 122 can also store the receipt and deposit event data and associated timestamps (e.g., time and/or date) in a second shared database 152-2 accessible by authenticated users of the item handling facility 126 and the transportation company or transporter. The system 100 can include additional shared databases to accommodate access by any combination of authenticated users of the item handling facility 126, the transportation company or transporter, and the like.

As mentioned above, the system 100 also includes a computing device 144 (e.g., a server) in communication with the devices 106, 124 and 132 (e.g., a smartphone, tablet, or mobile computer) of respective first, second and third users 104, 122 and 130 via a network 142 (e.g., a wired or wireless access point). For example, the computing device 144 can be in communication with the devices 106, 124 and 132 via respective communication links 143-1, 143-2 and 143-4, and 143-3.

The computing device 144 includes a processor 146 (e.g., a controller, a central processing unit (CPU), a graphics processing unit (GPU), or a combination thereof) in communication with a memory 148 (e.g., a non-transitory computer readable storage medium) implemented as a suitable combination of volatile and non-volatile memory elements. For example, the memory 148 can include a combination of volatile memory (e.g., Random Access Memory (RAM)) and non-volatile memory (e.g., read only memory (ROM), Electrically Erasable Programmable Read Only Memory (EEPROM), flash memory, etc.). The processor 146 and the memory 148 each comprise one or more integrated circuits.

The memory 148 can store a plurality of computer-readable instructions in the form of code 150 (e.g., an application) executable by the processor 146 to perform functionality discussed in greater detail below. For example, the code 150, when executed by the processor 146, configures the processor 146 to dynamically identify an item 103 across packaging levels thereof, track at least one attribute of transaction information (e.g., a contract or agreement) associated with the item 103, and share detailed item handling data associated with the transaction information via shared first and second databases 152-1 and 152-2 during logistics operations with respective logistics supply chain parties (e.g., a manufacturer, a distributor and/or at least one transportation company or transporter). The code 150, in other examples, can be implemented as a suite of distinct applications, or as a dedicated hardware element (e.g., an application-specific integrated circuit (ASIC)). The computing device 144 also includes a communications interface 154 such that the computing device 144 can exchange data with other devices, including the devices 106, 124, and 132 via the network 142.

The code 150 could be programmed using any suitable programming languages including, but not limited to, C, C++, C #, Java, or any other suitable language. Additionally, the code 150 could be distributed across multiple computer systems in communication with each other over a communications network, stored within hardware, and/or stored and executed on a cloud computing platform and remotely accessed by a computer system in communication with the cloud platform. The code 150, executed by the processor 146, could communicate with databases 152-1 and 152-2, which could be stored on the same computer system as the code 150, or on one or more other computer systems in communication with the code 150.

The computing device 144 stores in the memory 148, the databases 152-1, and 152-2. The database 152-1 can contain data indicative of the first identifier 112, the second identifier 116, the third identifier 117, and packaging information of the item 103 (e.g., packaging location, packaging date and/or time, manufacturer identification information, etc.) and is accessible by authenticated users of at least two of the manufacturing facility 102, an item handling facility 126 and a transportation company or transporter (not shown). The database 152-2 can contain data indicative of the fourth identifier, the third package identification number (e.g., a parcel identification number), item handling facility 126 location, shipping date and/or time, shipping (e.g., delivery) address, delivery instructions, or the like and is accessible by authenticated users of the item handling facility 126 and the transportation company or transporter.

Those skilled in the art will appreciate that the functionality implemented by the processor 146 via the execution of the code 150 may also be implemented by one or more specially designed hardware and firmware components such as a field-programmable gate array ("FPGA"), application-specific integrated circuit ("ASIC"), embedded system, or other customized hardware components without departing from the spirit or scope of the present disclosure. FIG. 1 is only one potential configuration, and the system 100 of the present disclosure can be implemented using a number of different configurations.

Figure 2:
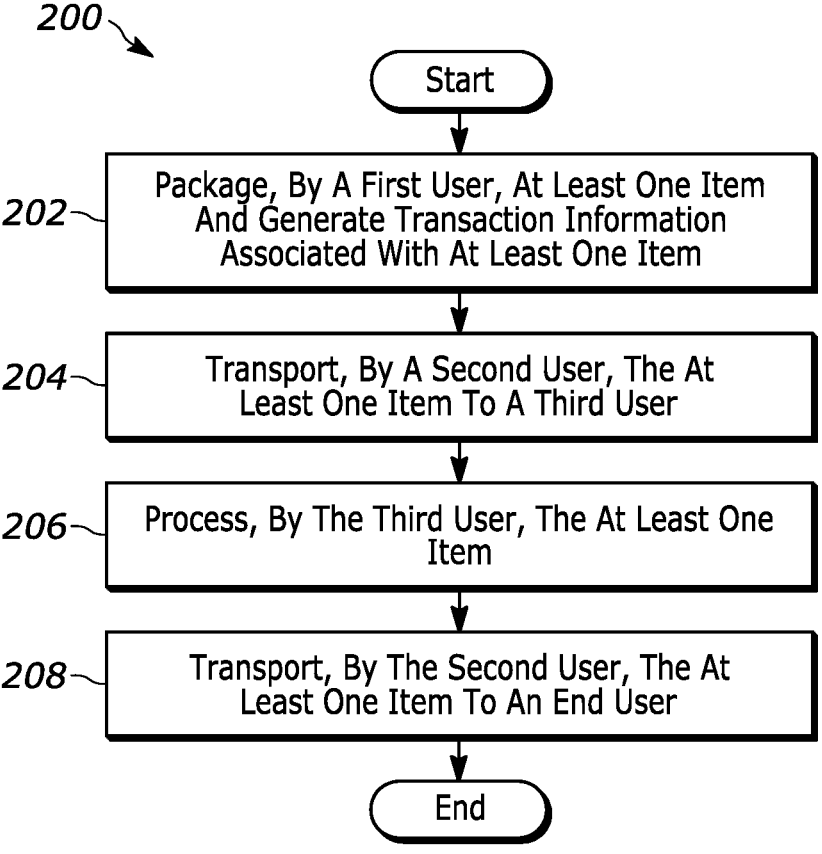
FIG. 2 is a flowchart illustrating processing steps carried out by an embodiment of the system of the present disclosure of FIG. 1.

FIG. 2 is a flowchart illustrating processing steps carried out by an embodiment of the system of the present disclosure of FIG. 1. The processing steps will be described in conjunction with their performance in the system (e.g., by the computing device 144 in conjunction with the devices 106, 124, and 132). In general, via performance of the processing steps, the system 100 can automatically and dynamically identify an item across packaging levels thereof, track at least one attribute of transaction information (e.g., a contract or agreement) associated with the at least one item, and share detailed item handling data associated with the transaction information during logistics operations with respective logistics supply chain parties (e.g., a manufacturer, a distributor and/or at least one transportation company or transporter). Beginning in step 202, a first user 104 (e.g., of a manufacturing facility 102) packages at least one item 103 and the system 100 generates transaction information associated with the at least one item 103. Then, in step 204, a second user 122 (e.g., of a transportation company or transporter) transports the at least one item 103 to a third user 130 (e.g., of an item handling facility 126). In step 206, the third user 130 processes the at least one item 103. In step 208, the second user 122 transports the at least one item 103 to an end user 142 (e.g., a customer or consumer) of a destination location 140 (e.g., a residence or business). Each of steps 202-208 will be described in greater detail below in relation to FIGS. 3-7.

Figure 3:
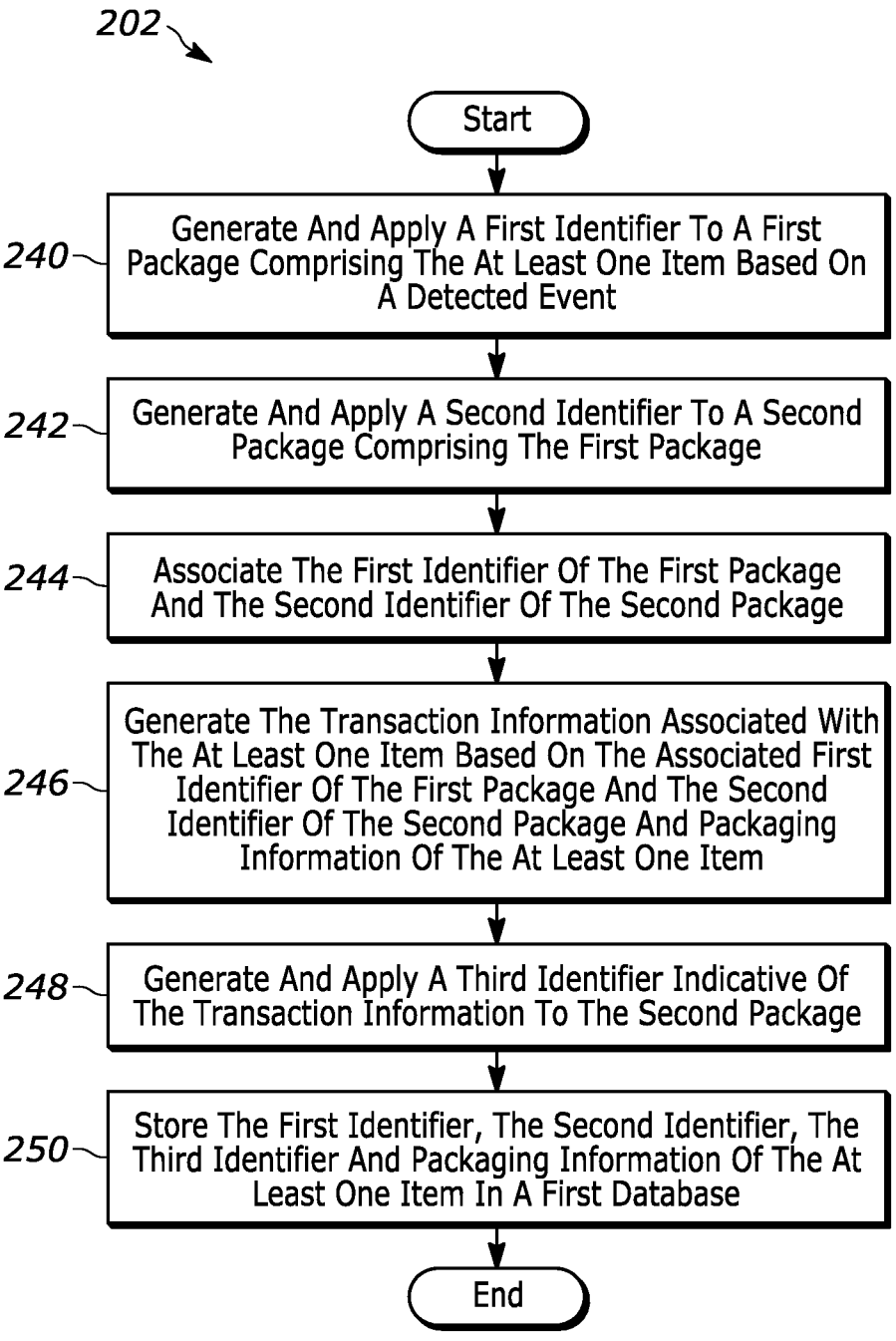
FIG. 3 is a flowchart illustrating step 202 of FIG. 2 in greater detail.

FIG. 3 is a flowchart illustrating step 202 of FIG. 2 in greater detail. In step 240, the system 100 generates a first identifier 112 to be applied to a first package 110 comprising the at least one item 103 based on a detected event. The first identifier 112 can include, but is not limited to, one or more of machine-readable symbol, a label, a temperature sensitive marker, a barcode, a radio frequency identification (RFID) tag, a quick response (QR) and a Bluetooth Low Energy (BLE) beacon. The first identifier 112 displays, carries, and/or stores identification information (e.g., a serial number) of the at least one item 103. The first identifier 112 can be generated based on a detected event (e.g., a workflow trigger). The detected event can be associated with the item 103 and can include, but is not limited, a purchase order, inventory reallocation, and a threshold (e.g., a shelf-life of the item 103). The first package 110 can be a first level of packaging of the at least one item 103.

In step 242, the system 100 generates a second identifier 116 to be applied to a second package 114 comprising the first package 110. The second identifier 116 can include, but is not limited to, one or more of machine-readable symbol, a label, a temperature sensitive marker, a barcode, an RFID tag, a QR and a BLE beacon. The second identifier 116 displays, carries and/or stores identification information (e.g., a serial number) of the at least one item 103. The second package 114 can be a second level of packaging of the at least one item 103.

An item 103 may be packaged across several packaging levels for transportation. For example, at least one item 103 may be packaged within a case (e.g., first package 110), and the case may be packaged within a pallet (e.g., a second package 114 comprising a plurality of first packages 110) which is loaded into a container for transportation. In another example, the at least one item 103 may be packaged within a carton (e.g., a first package 110), the carton may be packaged within a case (e.g., a second package 114 comprising a plurality of first packages 110), and the case may be packaged within a pallet (e.g., a third package (not shown) comprising a plurality of second packages 114) which is loaded into a container for transportation. In step 244, the system 100 associates the first identifier 112 of the first package 110 and the second identifier 116 of the second package 114. For example, the second identifier 114 can display, carry and/or store identification information (e.g., a serial number) of the at least one item 103 and/or the first package 110. The association is indicative of a nested or tiered relationship between the first package 110 and the second package 114. The system 100 can extend the association to include additional levels of packaging of the at least one item 103.

In step 246, the system 100 generates transaction information associated with the at least one item 103 based on the associated first identifier 112 of the first package 110 and the second identifier 116 of the second package 114 and packing information of the at least one item 103. The packaging information can include, but is not limited to, a packaging location, a packaging date and/or time, and manufacturer identification information. The system 100 can transmit at least one of an alert and notification to an authenticated external system or database via at least one application programming interface in response to an event associated with the transaction information. In step 248, the system 100 generates a third identifier 117 indicative of the transaction information and the first user 104 can apply the third identifier 117 indicative of the transaction information (e.g., a contract or agreement) to the second package 114. The third identifier 117 can include, but is not limited to, one or more of a machine-readable symbol, a label, a barcode, an RFID tag, a QR code, and a BLE beacon. In step 250, the system 100 can store the first identifier 112, the second identifier 116, the third identifier 117 and the packaging information of the at least one item 103 in a first shared database 152-1 accessible by authenticated users of at least two of a manufacturing facility 102, an item handling facility 126 and a transportation company or transporter.

Figure 4:
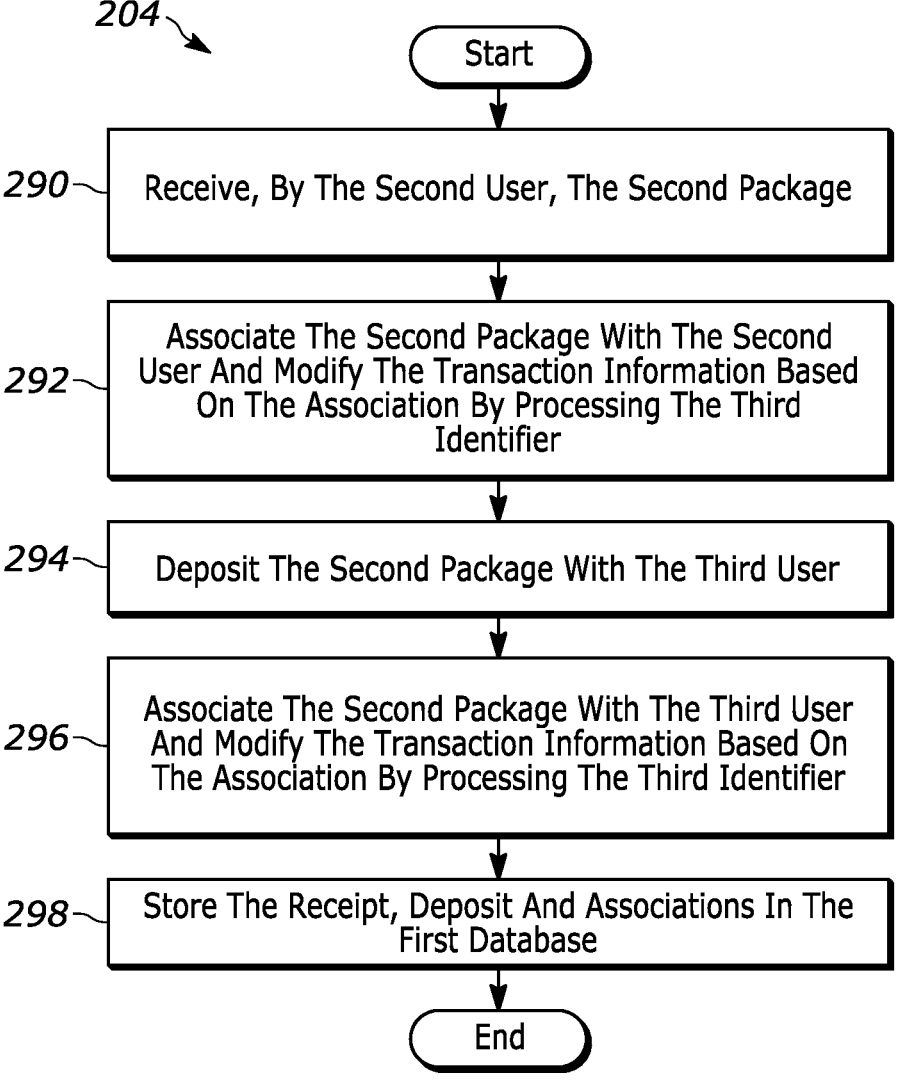
FIG. 4 is a flowchart illustrating step 204 of FIG. 2 in greater detail.

FIG. 4 is a flowchart illustrating step 204 of FIG. 2 in greater detail. In step 290, the second user 122 receives the second package 114 from the first user 104 of the manufacturing facility 102. As mentioned above, the second user 122 can utilize a device 124 for authentication and processing. For example, the second user 122 can input a passcode and/or submit biometric data (e.g., a fingerprint) via a GUI of the mobile device 124 for authentication purposes. Upon authentication, the second user 122 can receive the second package 114 from the first user 104 of the manufacturing facility 102.

In step 292, the second user 122 can utilize the device 124 to associate the second package 114 with the transportation company or transporter (e.g., the second user 122) by processing the third identifier 117 via the device 124, and the system 100 can modify the transaction information by adding the association of the second package 114 with the second user 122 to the transaction information. This association can be indicative of receipt of the second package 114 by the transportation company or transporter from the manufacturing facility 102.

In step 294, the second user 122 can deposit the second package 114 with a third user 130 of an item handling facility 126. For example, the second user 122 can transport and deliver the second package 114 to the third user 130 of an item handling facility 126. In step 296, the second user 122 can utilize the device 124 to associate the second package 114 with the item handling facility 126 (e.g., the third user 130) by processing the third identifier 117 via the device 124, and the system 100 can modify the transaction information by adding the association of the second package 114 with the third user 130 to the transaction information. This association can be indicative of receipt of the second package 114 by the item handling facility 126 from the transportation company or transporter.

In step 298, the system 100 can store receipt and deposit event data and associated timestamps (e.g., time and/or date), in addition to the associations, in a first shared database 152-1 accessible by authenticated users of at least two of the manufacturing facility 102, an item handling facility 126 and the transportation company or transporter.

Figure 5:
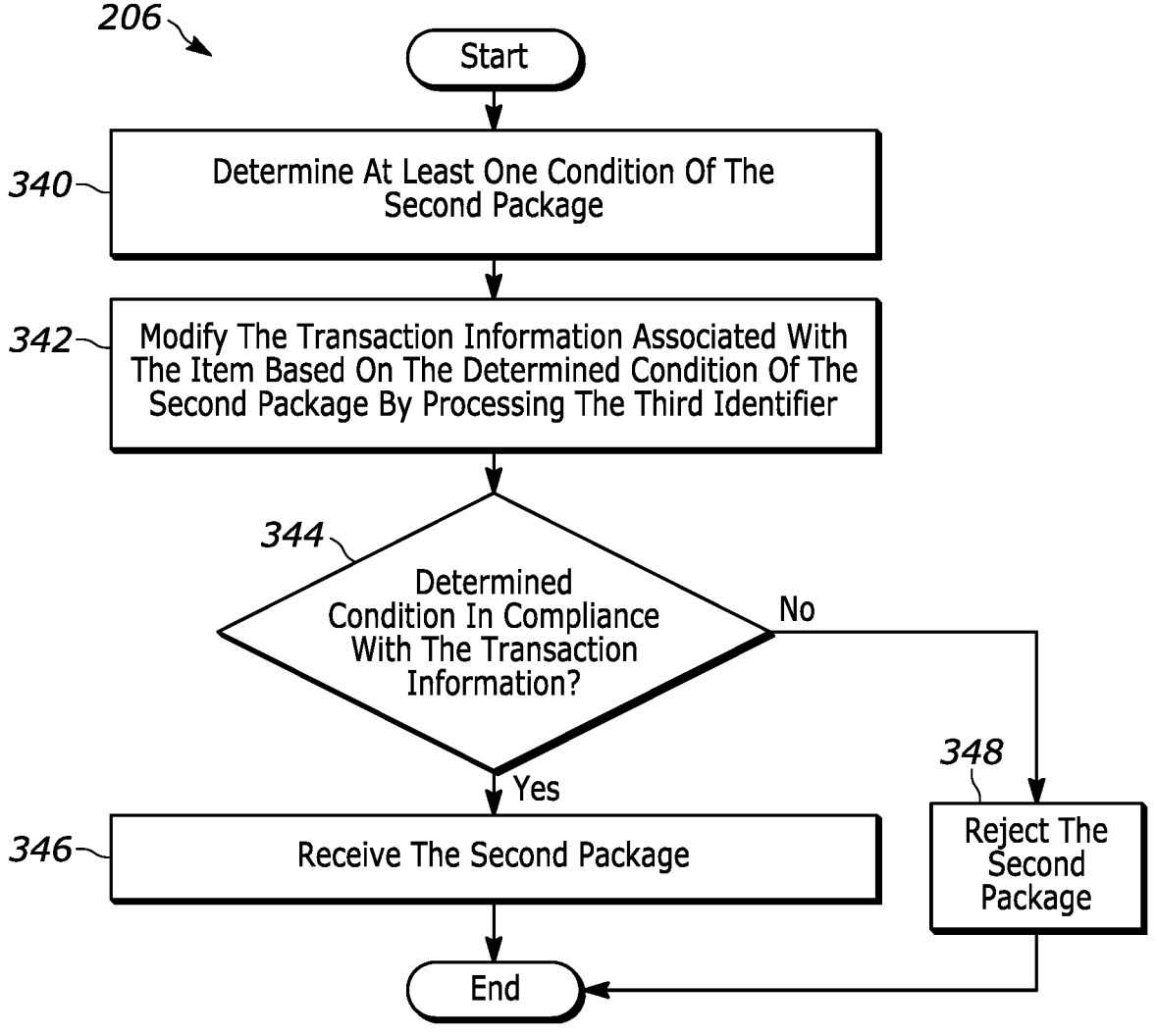
FIG. 5 is a flowchart illustrating step 206 of FIG. 2 in greater detail.

FIG. 5 is a flowchart illustrating step 206 of FIG. 2 in greater detail. The third user 130 can utilize a device 132 for authentication and processing. For example, the third user 130 can input a passcode and/or submit biometric data (e.g., a fingerprint) via a GUI of the mobile device 132 for authentication purposes. Upon authentication, the third user 130 can inspect the second package 114.

In step 340, the third user 130 determines at least one condition (e.g., fair, tampered, damaged, environmental, etc.) of the second package 114. The at least one condition can be indicative of a state of the second package 114 as a whole and/or a state of portions thereof (e.g., one or more first packages 110). The at least one condition can include, but is not limited to, one or more of fair (e.g., original, sealed, unadulterated, untarnished, or the like), tampered (e.g., unsealed, opened, ripped, or the like), damaged (e.g., crushed, wet, or the like) and environmental (e.g., freezing, ambient, or the like). In step 342, the system 100 can associate the determined at least one condition with the transaction information by processing of the third identifier 117 via the device 132. For example, by processing the third identifier 117 via the device 132, the system 100 can add the determined at least one condition of the second package 114 to the transaction information.

Then, in step 344, the system 100 can automatically and dynamically determine whether the determined at least one condition complies with the transaction information based on one or more of the first identifier 112 of the first package 110 and the second identifier 116 of the second package 114 associated with the transaction information. For example, if the transaction information indicates that the at least one item 103 is a vial of medicine and the determined at least one condition of the second package 114 is fair, then the second package 114 can be considered to comply with the transaction information. Alternatively, if the transaction information indicates that the at least one item 103 is a vial of medicine and the determined at least one condition of the second package 114 is tampered, then the second package 114 can be considered not to comply with the transaction information.

If the system 100 determines that the at least one condition complies with the transaction information, then the process proceeds to step 346. In step 346, the system 100 can display a message (e.g., a text, alert, request, or the like) to the third user 130 via the GUI of the device 130 to receive/accept the second package 114 and/or to submit an input (e.g., keystroke, tap, button depression, or the like) via the GUI or an input device (e.g., pad, keyboard, or the like) of the device 130 to confirm receipt/acceptance of the second package 114. Alternatively, if the system 100 determines that the at least one condition does not comply with the transaction information, then the process proceeds to step 348. In step 348, the system 100 can display a message (e.g., a text, alert, request, or the like) to the third user 130 via the GUI of the device 130 to reject the second package 114 and/or to submit an input (e.g., keystroke, tap, button depression, or the like) via the GUI or an input device (e.g., pad, keyboard, or the like) of the device 130 to confirm rejection of the second package 114.

Figure 6:
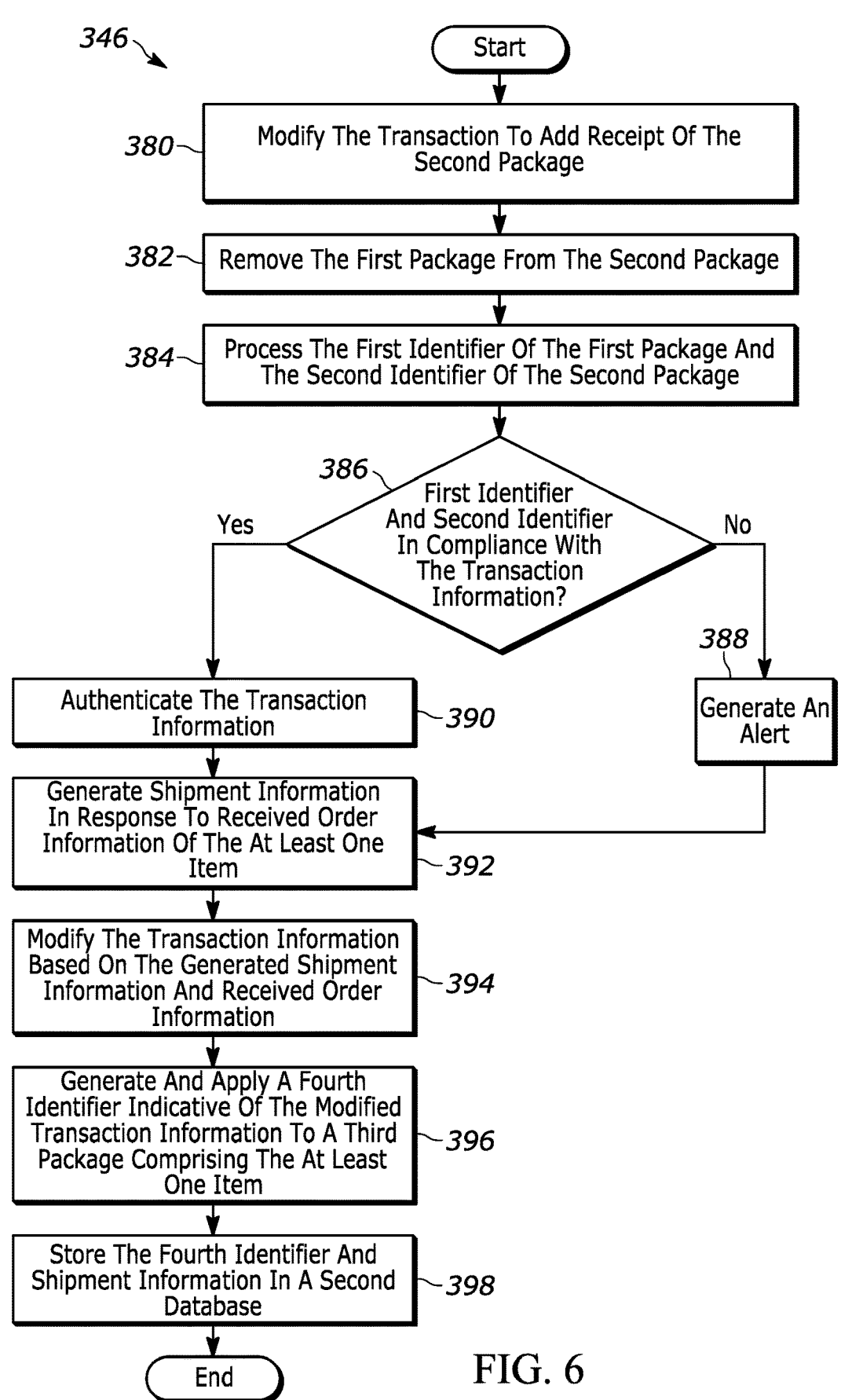
FIG. 6 is a flowchart illustrating step 346 of FIG. 5 in greater detail.

FIG. 6 is a flowchart illustrating step 346 of FIG. 5 in greater detail. Upon receipt/acceptance of the second package 114, the system 100 can modify the transaction information. In step 380, the system 100 can add a receiving event to the transaction information to indicate that the second package 114 has been received/accepted by the item handling facility 126 and/or to notify (e.g., alert) the manufacturing facility 102 that the second package 114 has been received/accepted by the item handling facility 126. In steps 382 and 384, the third user 130 can deconstruct (e.g., breakdown) the second package 114 (e.g., a pallet) by processing the second identifier 116 of the second package 114 and processing the first identifier 112 of each first package 110 when removing each first package 110 from the second package 114.

In step 386, the system 100 can determine, based on the processing of the second identifier 116 and each first identifier 112, whether the association (e.g., nested or tiered relationship) of each first identifier 112 of each first package 110 and the second identifier 116 of the second package 114 complies with the transaction information. If the system 100 determines that the association of each first identifier 112 of each first package 110 and the second identifier 116 of the second package 114 complies with the transaction information, then the process proceeds to step 390. In step 390, the system 100 authenticates the transaction information. For example, the system 100 can add an authentication event to the transaction information indicating that the item 103 associated with the transaction information is authentic and/or that the terms of the transaction information have been satisfied. Alternatively, if the system 100 determines that the association of each first identifier 112 of each first package 110 and the second identifier 116 of the second package 114 does not comply with the transaction information, then the process proceeds to step 388. In step 388, the system 100 can generate a notification (e.g., an alert). For example, the system 100 can add an alert to the transaction information indicating that at least one item 103 is fraudulent (e.g., a counterfeit), an incorrect item, and/or missing (e.g., when an insufficient number of first identifiers 112 are processed). In this way, the system 100 can ensure the integrity of the transaction information and facilitate the resolution of disputes between respective logistics supply chain parties.

In step 392, the system 100 can generate shipment information for at least one item 103 in response to received order information for the at least one item 103. For example, the item handling facility 126 can receive order information for at least one item 103 from an end user 142 (e.g., a customer or consumer) to be fulfilled by the item handling facility 126. The order information can include, but is not limited to, a quantity of the at least one item 103, a shipping (e.g., delivery) address, delivery instructions, or the like. The shipment information can include, but is not limited to, a third package identification number (e.g., a parcel identification number), an item handling facility 126 location, shipping date and/or time, a shipping address, delivery instructions, or the like.

In step 394, the system 100 can modify the transaction information based on the generated shipment information and received order information. For example, the system 100 can add the shipment information and the order information to the transaction information. In step 396, the system 100 can generate and the third user 130 can apply, a fourth identifier 138 indicative of the modified transaction information to a third package 136 comprising the at least one item 103. Then, in step 398, the system 100 can store the fourth identifier 138 and the shipment information in a second shared database 152-2 accessible by authenticated users of the item handling facility 126 and the transportation company or transporter.

It should be understood that the third user 130 can store, in a proprietary database 134 of the item handling facility 126, information associated with the at least one item 103 including, but not limited to, an inspection event (e.g., a date and/or time, location, third user 130 identification information, or the like), a determined condition of the second package 114, a receiving/acceptance event or rejection event (e.g., a date and/or time, location, third user 130 identification information, or the like), an association of the first identifier 112 of the first package 110 and the second identifier 116 of the second package 114, compliance with the association (e.g., an authentication event or notification), and a shipping event (e.g., a date and/or time, location, and/or third user 130 identification information).

FIG. 7 is a flowchart illustrating step 208 of FIG. 2 in greater detail. In step 440, the second user 122 receives the third package 136 from the third user 130 of the item handling facility 126. As mentioned above, the second user 122 can utilize a device 124 for authentication and processing. For example, the second user 122 can input a passcode and/or submit biometric data (e.g., a fingerprint) via a GUI of the device 124 for authentication purposes. Upon authentication, the second user 122 can receive the third package 136 from the third user 130 of the item handling facility 102.

In step 442, the second user 122 can utilize the device 124 to associate the third package 136 with the transportation company or transporter (e.g., the second user 122) by processing the fourth identifier 138 via the device 124, and the system 100 can modify the transaction information by adding the association of the third package 136 with the second user 122 to the transaction information. This association can be indicative of receipt of the third package 136 by the transportation company or transporter from the item handling facility 136.

In step 444, the second user 122 can deposit the third package 136 with an end user 142 (e.g., a customer or consumer) of a destination location 140 (e.g., a residence or business). For example, the second user 122 can transport and deliver the third package 136 to the end user 142 of destination location 140-1. In step 446, the second user 122 can utilize the device 124 to associate the third package 136 with the destination location 140-1 (e.g., the end user 142) by processing the fourth identifier 138 via the device 124, and the system 100 can modify the transaction information by adding the association of the third package 136 with the end user 142 to the transaction information. This association can be indicative of receipt of the third package 136 by the destination location 140-1 from the transportation company or transporter.

In step 298, the system 100 can store receipt and deposit event data and associated timestamps (e.g., time and/or date), in addition to the associations, in the second shared database 152-2 accessible by authenticated users of the item handling facility 126 and the transportation company or transporter.

As mentioned above, the system 100 can automatically and dynamically identify items across packaging levels of an item, track at least one attribute of transaction information (e.g., a contract or agreement) associated with the at least one item, and share detailed item handling data associated with the transaction information during logistics operations with respective logistics supply chain parties (e.g., a manufacturer, a distributor and/or at least one transportation company).

For example, a second package 114 (e.g., a pallet), comprising a plurality of first packages 110 having at least one item 103, may include a single first package 110 determined to be damaged. In conventional systems, the damaged first package 110 may be tracked by only one logistics supply chain party (e.g., a transportation company) at the shipment level. However, if an end user 142 (e.g., a customer or consumer) inspects an item 103 and determines that the item 103 is damaged, it is useful to know that the damaged item 103 was positioned in a different first package 110 of the second package 114 than the single first package 110 determined to be damaged. As such, the present disclosure eliminates these and other problems with conventional systems and methods by automatically and dynamically identifying items across packaging levels of an item, tracking at least one attribute of transaction information associated with the at least one item, and sharing detailed item handling data associated with the transaction information during logistics operations with respective logistics supply chain parties.

Figure 8:
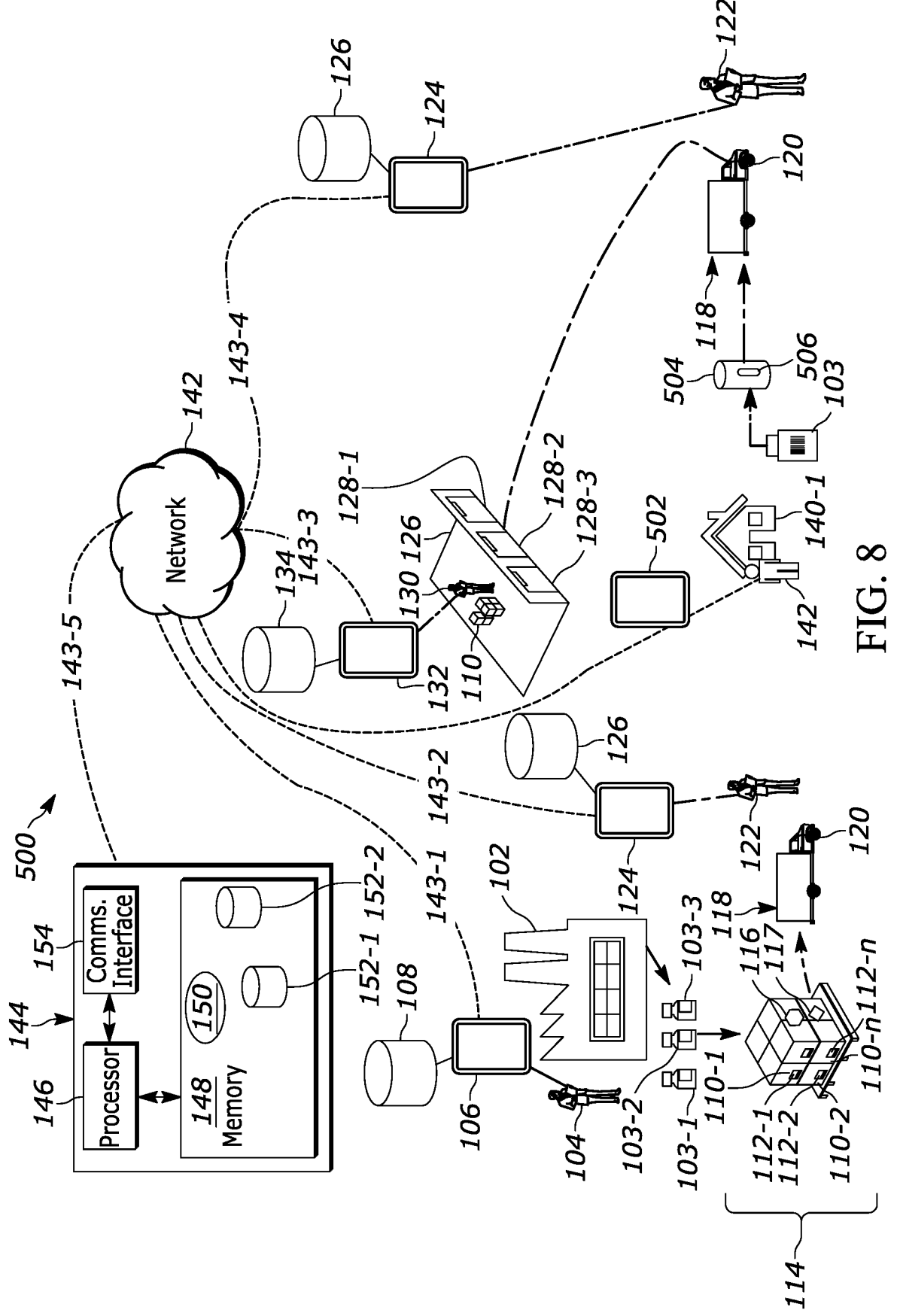
FIG. 8 is a diagram illustrating an embodiment of a system of the present disclosure for tracking item handling data during logistics operations.

FIG. 8 is a diagram illustrating an embodiment of a system of the present disclosure for tracking item handling data during logistics operations. The system 500 includes a computing device 144 communicatively coupled with, devices 106, 124, 132, and 502. The devices 106, 124, 132, 502 are respectively associated with a first user 104 (e.g., of a manufacturing facility 102), a second user 122 (e.g., of a transportation company or transporter), a third user 130 (e.g., of an item handling facility 126), and an end user 142 (e.g., a customer or consumer of a destination location 140-1).

As shown in FIG. 8, the computing device 144 can exchange data with each of the devices 106, 124, 132, and 502 e.g., via a network 142 implemented as any suitable combination of local and wide-area networks and respective communication links 143-1, 143-2 and 143-4, 143-3, and 508. As described in greater detail below in relation to FIGS. 9-12, the system 500 provides for automatically and dynamically identifying an item across packaging levels thereof, tracking at least one attribute of transaction information (e.g., a contract or agreement) associated with the item, sharing detailed item handling data (e.g., event data and/or conditions) associated with the transaction information during logistics operations with respective logistics supply chain parties (e.g., a manufacturer, a distributor and/or at least one transportation company), and associating the detailed item handling data with an item that is returned (e.g., via a returned merchandise authorization (RMA)). The components and devices of the system 500 of FIG. 8 share commonalities with the system 100 of FIG. 1, and for brevity, will not be described in greater detail with respect to FIG. 8. FIG. 8 is only one potential configuration, and the system 500 of the present disclosure can be implemented using a number of different configurations.

Figure 9:
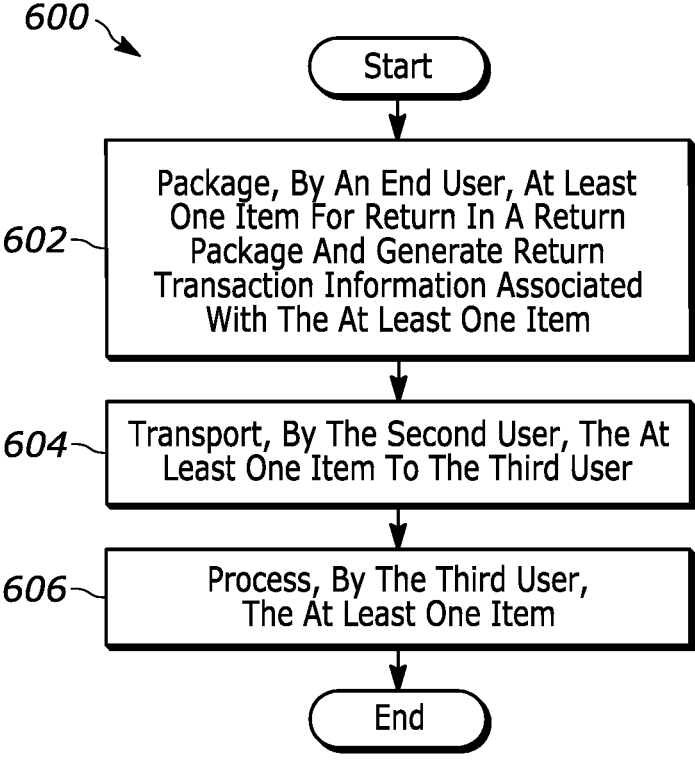
FIG. 9 is a flowchart illustrating processing steps carried out by the embodiment of the system of the present disclosure of FIG. 8.

FIG. 9 is a flowchart illustrating processing steps carried out by the embodiment of the system of the present disclosure of FIG. 8. The processing steps will be described in conjunction with their performance in the system 500 (e.g., by the computing device 144 in conjunction with the devices 124, 132, and 502). In general, via performance of the processing steps, the system 500 can automatically and dynamically identify an item across packaging levels thereof, track at least one attribute of transaction information associated with the item, share detailed item handling data associated with the transaction information during logistics operations with respective logistics supply chain parties, and associate the detailed item handling data with an item that is returned (e.g., via an RMA).

Beginning in step 602, an end user 142 (e.g., of a destination location 140-1) packages at least one item 103 for return (e.g., to an item handling facility 126) in a return package 504 and the system 500 generates return transaction information associated with the at least one item 103. Then, in step 604, a second user 122 (e.g., of a transportation company or transporter) transports the at least one item 103 to a third user 130 (e.g., of an item handling facility 126). In step 604, the third user 130 processes the at least one item 103. Each of steps 602-206 will be described in greater detail below in relation to FIGS. 10-12.

Figure 10:
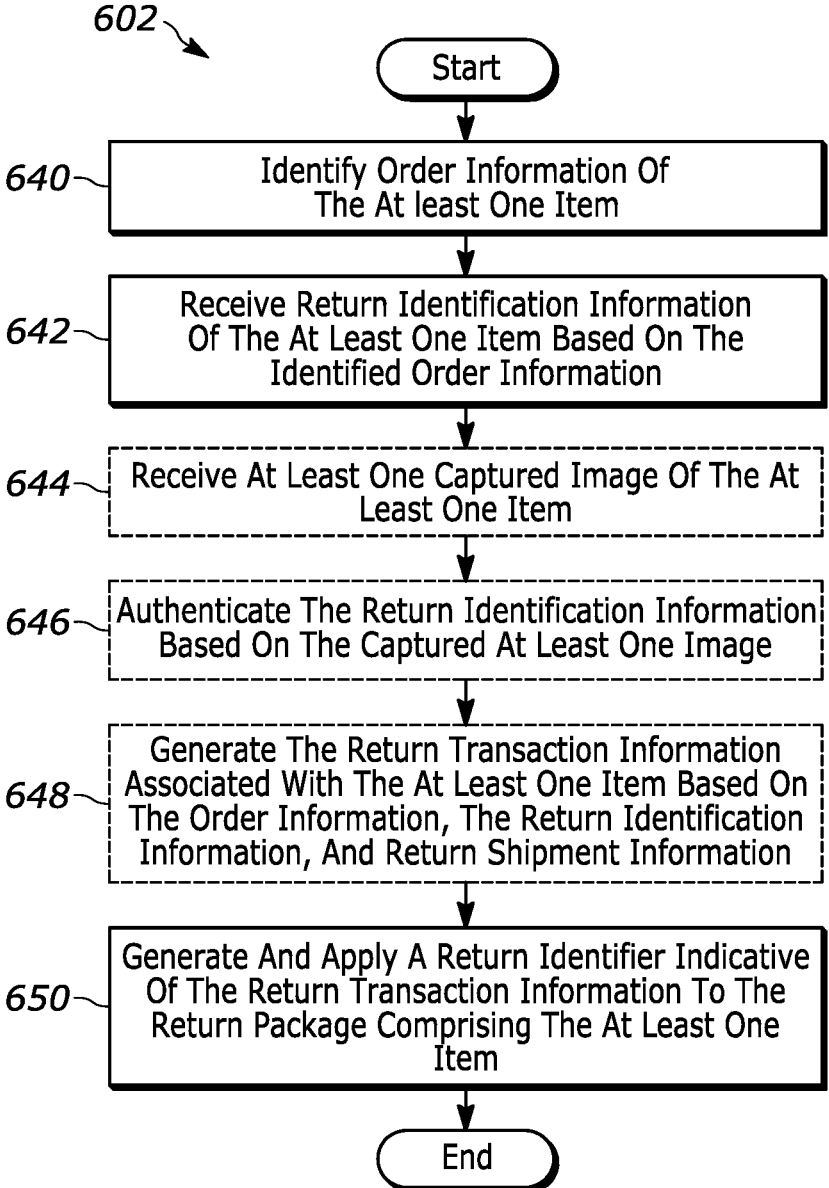
FIG. 10 is a flowchart illustrating step 602 of FIG. 9 in greater detail.

FIG. 10 is a flowchart illustrating step 604 of FIG. 9 in greater detail. In step 640, the end user 142 identifies order information of the at least one item 103. For example, the end user 142 can connect to an item handling facility 126 (e.g., via a website, portal, application, etc.) to identify the order information of the at least one item 103. The order information can include, but is not limited to, an identifier of an order (e.g., a code, confirmation number, serial number, etc.) a date of the order, a time of the order, an identifier (e.g., a serial number, Universal Product Code (UPC), stock keeping unit (SKU), etc.) of the at least one item 103, a name and/or image of the at least one item 103, a quantity of an ordered item 103, and payment data for the order. In step 642, the system 500 can receive return identification information of the at least one item 103 based on the identified order information. The return identification information can include, but is not limited to, a reason or justification for the return and/or a description.

Steps 644 and 646 of the process are optional. In step 644, the system 500 receives at least one captured image of the at least one item 103. In step 646, the system 500 authenticates the return identification information based on the at least one captured image. For example, if the return identification information indicates that a damaged condition of the at least one item 103 is the reason or justification for the return thereof, then the system 500 can authenticate the return identification information based on at least one captured image depicting the damaged condition of the at least one item 103.

In step 648, the system 500 generates the return transaction information associated with the at least one item 103 based on the order information, the return identification information, and return shipment information (e.g., a tracking number, a date, a time, etc.). The system 500 can transmit at least one of an alert and notification to an authenticated external system or database (e.g., of a merchant, vendor, etc.) via at least one application programming interface in response to an event associated with the return transaction information. In step 650, the system 500 generates a return identifier 506 indicative of the return transaction information and the end user 142 can apply the return identifier 506 indicative of the return transaction information (e.g., a contract or agreement) to the return package 504. The return identifier 506 can include, but is not limited to, one or more of a machine-readable symbol, a label, a barcode, an RFID tag, a QR code, and a BLE beacon.

FIG. 11 is a flowchart illustrating step 604 of FIG. 9 in greater detail. In step 680, the second user 122 receives the return package 504 from the end user 142 of the destination location 140-1. As mentioned above, the second user 122 can utilize a device 124 for authentication and processing. For example, the second user 122 can input a passcode and/or submit biometric data (e.g., a fingerprint) via a GUI of the mobile device 124 for authentication purposes. Upon authentication, the second user 122 can receive the return package 504 from the end user 142 of the destination location 140-1.

In step 682, the second user 122 can utilize the device 124 to associate the return package 504 with the transportation company or transporter (e.g., the second user 122) by processing the return identifier 506 via the device 124, and the system 500 can modify the return transaction information by adding the association of the return package 504 with the second user 122 to the return transaction information. This association can be indicative of receipt of the return package 504 by the transportation company or transporter from the end user 142.

In step 684, the second user 122 can deposit the return package 504 with a third user 130 of an item handling facility 126. For example, the second user 122 can transport and deliver the return package 504 to the third user 130 of an item handling facility 126. In step 686, the second user 122 can utilize the device 124 to associate the return package 504 with the item handling facility 126 (e.g., the third user 130) by processing the return identifier 506 via the device 124, and the system 500 can modify the return transaction information by adding the association of the return package 504 with the third user 130 to the return transaction information. This association can be indicative of receipt of the return package 504 by the item handling facility 126 from the transportation company or transporter.

In step 688, the system 500 can store receipt and deposit event data and associated timestamps (e.g., time and/or date), in addition to the associations, in a shared database 152-2 accessible by authenticated users of an item handling facility 126 and the transportation company or transporter.

Figure 12:
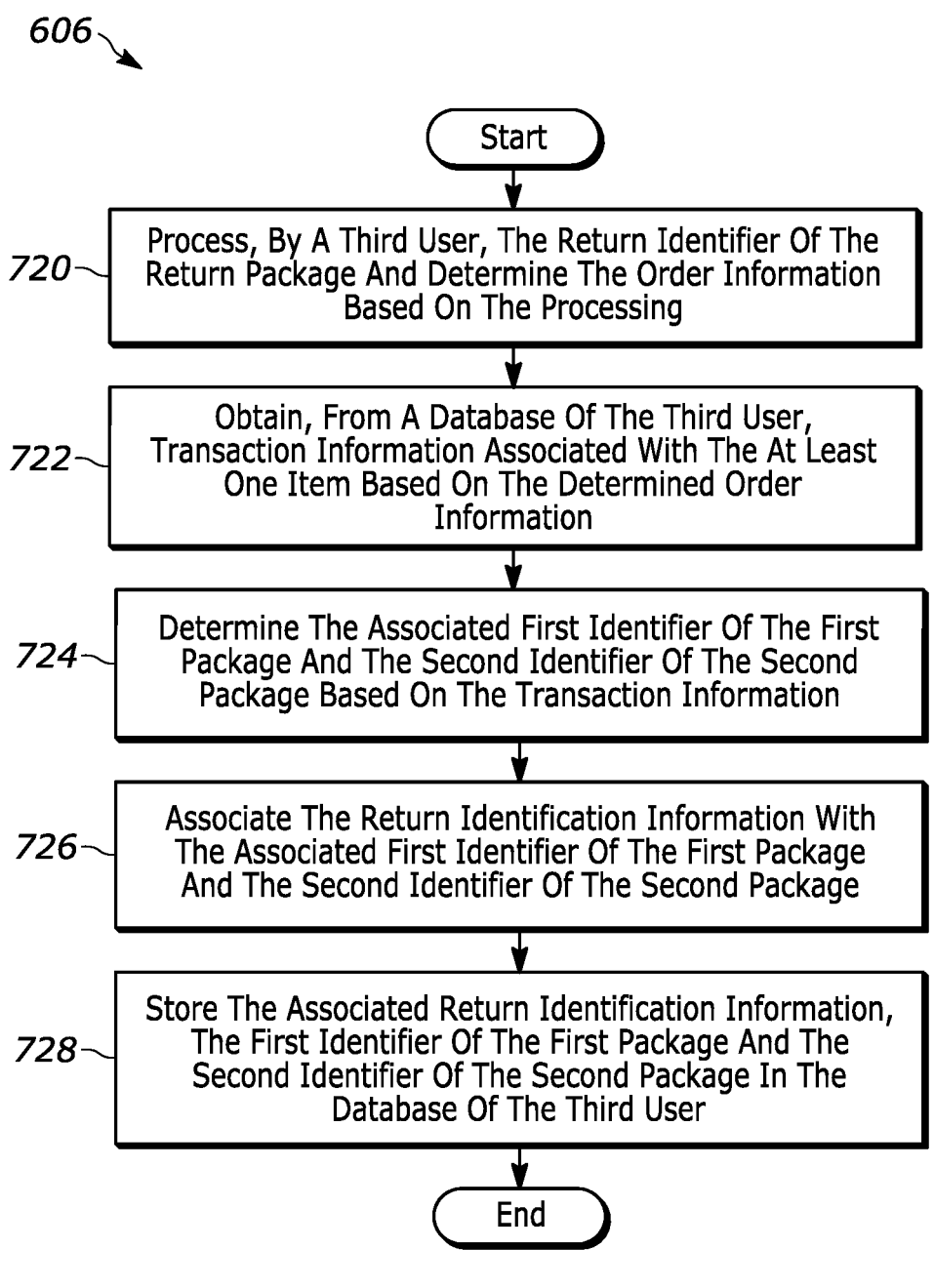
FIG. 12 is a flowchart illustrating step 606 of FIG. 9 in greater detail.

FIG. 12 is a flowchart illustrating step 606 of FIG. 9 in greater detail. As mentioned above, the third user 130 can utilize a device 132 for authentication and processing. For example, the third user 130 can input a passcode and/or submit biometric data (e.g., a fingerprint) via a GUI of the mobile device 132 for authentication purposes. Upon authentication, in step 720, the third user 130 can process the return identifier 506 of the return package 504 via the mobile device 132 and the system 500 can determine the order information of the at least one item 103 based on the processing. In step 722, the system 500 can obtain, from a database 134 of the item handling facility 126, transaction information associated with the at least one item 103 based on the determined order information. The transaction information can be indicative of handling data of the at least one item 103 prior to the return of the at least one item 103 and can comprise an association of a first identifier 112 of a first package 110 comprising the at least one item 103 and a second identifier 116 of a second package 114 comprising the first package 110 where the association is indicative of a nested relationship, packaging information of the at least one item 103, and shipment information of the at least one item 103. In step 724, the system 500 can determine the associated first identifier 112 of the first package 110 and the second identifier 116 of the second package 114 based on the transaction information.

Then, in step 726, the system 500 can associate the return identification information of the item 103 with the associated first identifier 112 of the first package 110 and the second identifier 116 of the second package 114. In step 728, the system 500 can store the associated return identification information, the first identifier 112 of the first package 110 and the second identifier 116 of the second package 114 in the database 134 of the item handling facility 126. In this way, the item handling facility 126 can associate the return identification information of the item 103 with transaction information about the item 103 prior to the original shipment.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A method for tracking item handling data, comprising:
associating, by a first device of a first user, a first identifier of at least one first package comprising at least one item and a second identifier of a second package, the second package comprising the at least one first package and the association being indicative of a nested relationship;
generating transaction information associated with the at least one item based on the association and packaging information of the at least one item;
generating and applying a third identifier indicative of the transaction information associated with the at least one item to the second package;
authenticating a second user via a second device;
receiving, based on the authentication of the second user, the second package by the second user;
associating the second package with the second user and adding the association of the second package with the second user to the transaction information by processing the third identifier via the second device;
tracking at least one attribute of the transaction information associated with the at least one item via the third identifier;
associating the second package with a third user and adding the association of the second package with the third user to the transaction information by processing the third identifier via the second device;
authenticating the third user via a third device;
determining, by the third user, at least one condition of the second package;
adding the determined at least one condition of the second package to the transaction information by processing the third identifier via the third device;
determining whether the determined condition complies with the transaction information;
receiving the second package by the third user when the determined condition complies with the transaction information; and
rejecting the second package by the third user when the determined condition does not comply with the transaction information, wherein
each of the first device, the second device, and the third device is a mobile barcode scanner, and the determined at least one condition of the second package is indicative of one or more of a fair, a tampered, a damaged and an environmental condition.

2. The method of claim 1, further comprising
authenticating the first user via the first device; and
generating the first identifier of the at least one first package comprising the at least one item based on a detected event.

3. The method of claim 1, further comprising
storing the first identifier, the second identifier, the third identifier and the packaging information in a first database, wherein
the first database is shared with at least two of the first user, the second user and the third user, and
the first user is a manufacturer, the second user is a transporter, and the third user is a distributor.

4. The method of claim 1, further comprising
adding a receiving event to the transaction information based on receiving the second package by the third user;
processing the first identifier of the at least one first package and the second identifier of the second package via the third device;
determining whether the association of the first identifier of the at least one first package and the second identifier of the second package complies with the transaction information;
authenticating the transaction information when the association complies with the transaction information; and
adding an alert to the transaction information when the association does not comply with the transaction information.

5. The method of claim 4, further comprising
generating shipment information in response to received order information of the at least one item;
modifying the transaction information by adding the shipping information and the order information to the transaction information;
generating and applying a fourth identifier indicative of the modified transaction information to a third package comprising the at least one item;
storing the fourth identifier and the shipment information in a second database, wherein
the second database is shared with the second user and the third user, and the second user is a transporter, and the third user is a distributor.

6. The method of claim 5, wherein
the first identifier, the second identifier, the third identifier, and the fourth identifier are one or more of a machine readable symbol, a label, a temperature sensitive marker, a barcode, a radio frequency identification (RFID) tag, a quick response (QR) and a Bluetooth Low Energy (BLE) beacon.

7. The method of claim 1, wherein
the transaction information is one of a contract and an agreement, and is encrypted or added to a blockchain.

8. A system for tracking item handling data, comprising,
a first device;
a second device;
a third device;
one or more processors; and
a non-transitory computer-readable memory coupled to the first device, the second device, the third device, and the one or more processors, the memory storing instructions thereon that, when executed by the one or more processors, cause the one or more processors to:
associate, by the first device of a first user, a first identifier of at least one first package comprising at least one item and a second identifier of a second package, the second package comprising the at least one first package and the association being indicative of a nested relationship;

generate transaction information associated with the at least one item based on the association and packaging information of the at least one item;

generate a third identifier indicative of the transaction information associated with the at least one item to be applied to the second package;

authenticate a second user via a second device;

receive, based on the authentication of the second user, the second package by the second user;

associate the second package with the second user and add the association of the second package with the second user to the transaction information by processing the third identifier via the second device;

track at least one attribute of the transaction information associated with the at least one item via the third identifier;

associate the second package with a third user and add the association of the second package with the third user to the transaction information by processing the third identifier via the second device;

authenticate the third user via a third device;

receive, from the third user, at least one determined condition of the second package;

add the determined at least one condition of the second package to the transaction information by processing the third identifier via the third device;

determine whether the determined condition complies with the transaction information;

notify the third user to receive the second package when the determined condition complies with the transaction information; and notify the third user to reject the second package when the determined condition does not comply with the transaction information, wherein each of the first device, the second device, and the third device is a mobile barcode scanner, and the determined at least one condition of the second package is indicative of one or more of a fair, a tampered, a damaged and an environmental condition.

9. The system of claim 8, wherein the instructions, when executed, further cause the one or more processors to:

authenticate the first user via the first device; and generate the first identifier of the at least one first package comprising the at least one item based on a detected event.

10. The system of claim 8, wherein the instructions, when executed, further cause the one or more processors to:

store the first identifier, the second identifier, the third identifier and the packaging information in a first database, wherein the first database is shared with at least two of the first user, the second user and the third user, and the first user is a manufacturer, the second user is a transporter, and the third user is a distributor.

11. The system of claim 8, wherein the instructions, when executed, further cause the one or more processors to:

add a receiving event to the transaction information when the third user receives the second package;

process the first identifier of the at least one first package and the second identifier of the second package via the third device;

determine whether the association of the first identifier of the at least one first package and the second identifier of the second package complies with the transaction information;

authenticate the transaction information when the association complies with the transaction information; and add an alert to the transaction information when the association does not comply with the transaction information.

12. The system of claim 11, wherein the instructions, when executed, further cause the one or more processors to:

generate shipment information in response to received order information of the at least one item;

modify the transaction information by adding the shipment information and the order information to the transaction information;

generate a fourth identifier indicative of the modified transaction information to be applied to a third package comprising the at least one item;

store the fourth identifier and the shipment information in a second database, wherein the second database is shared with the second user and the third user, and the second user is a transporter, and the third user is a distributor.

13. The system of claim 12, wherein the first identifier, the second identifier, the third identifier, and the fourth identifier are one or more of a machine readable symbol, a label, a temperature sensitive marker, a barcode, a radio frequency identification (RFID) tag, a quick response (QR) and a Bluetooth Low Energy (BLE) beacon.

14. The system of claim 8, wherein the transaction information is one of a contract and an agreement, and is encrypted or added to a blockchain.

15. A tangible non-transitory machine-readable medium comprising instructions for tracking item handling data that, when executed, cause a machine to:

associate, by a first device of a first user, a first identifier of at least one first package comprising at least one item and a second identifier of a second package, the second package comprising the at least one first package and the association being indicative of a nested relationship;

generate transaction information associated with the at least one item based on the association and packaging information of the at least one item;

generate a third identifier indicative of the transaction information associated with the at least one item to be applied to the second package;

authenticate a second user via a second device;

receive, based on the authentication of the second user, the second package by the second user;

associate the second package with the second user and add the association of the second package with the second user to the transaction information by processing the third identifier via the second device;

track at least one attribute of the transaction information associated with the at least one item via the third identifier;

associate the second package with a third user and add the association of the second package with the third user to the transaction information by processing the third identifier via the second device;

authenticate the third user via a third device;

receive, from the third user, at least one determined condition of the second package;

add the determined at least one condition of the second
   package to the transaction information by processing
   the third identifier via the third device;

determine whether the determined condition complies
   with the transaction information;

notify the third user to receive the second package when
   the determined condition complies with the transaction
   information; and notify the third user to reject the second package when the
   determined condition does not comply with the trans-
   action information, wherein each of the first device, the second device, and the third
   device is a mobile barcode scanner, and the determined at least one condition of the second
   package is indicative of one or more of a fair, a
   tampered, a damaged and an environmental condition.

* * * * *